United States Patent
Yamada et al.

(10) Patent No.: US 11,541,545 B2
(45) Date of Patent: Jan. 3, 2023

(54) INFORMATION PROCESSING APPARATUS, INFORMATION PROCESSING METHOD, AND SYSTEM

(71) Applicant: CANON KABUSHIKI KAISHA, Tokyo (JP)

(72) Inventors: Daisuke Yamada, Kawasaki (JP); Tomoaki Higo, Kawasaki (JP); Kazuhiko Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 337 days.

(21) Appl. No.: 16/578,073

(22) Filed: Sep. 20, 2019

(65) Prior Publication Data
US 2020/0101613 A1 Apr. 2, 2020

(30) Foreign Application Priority Data
Sep. 27, 2018 (JP) .............................. JP2018-182089

(51) Int. Cl.
*B25J 9/16* (2006.01)
*G06T 7/73* (2017.01)

(52) U.S. Cl.
CPC ............. *B25J 9/1687* (2013.01); *B25J 9/163* (2013.01); *B25J 9/1697* (2013.01); *G06T 7/73* (2017.01)

(58) Field of Classification Search
CPC ........ B25J 9/1687; B25J 9/163; B25J 9/1697; B25J 9/1679; B25J 11/00; B25J 19/021; B25J 19/023; B25J 9/1661; B25J 9/1664; B25J 11/0095; B25J 13/08; G06T 7/73; G06T 1/0014; G06T 7/0004; G06T 7/001; G06T 7/74; G05B 2219/39106; G05B 2219/40532; G05B 2219/31047; G05B 2219/31048; G05B 2219/36251; G05B 2219/24012; G05B 2219/35506; G05B 2219/40019; H04N 7/185; H04N 5/23203;
(Continued)

(56) References Cited

U.S. PATENT DOCUMENTS 7,266,422 B1    9/2007  DeMotte
9,630,320 B1    4/2017  Konolige
(Continued)

FOREIGN PATENT DOCUMENTS

CN    105364927 A    3/2016
CN    105437248 A    3/2016
(Continued)

*Primary Examiner* — Abby Y Lin
*Assistant Examiner* — Esvinder Singh
(74) *Attorney, Agent, or Firm* — Canon U.S.A., Inc., IP Division

(57) ABSTRACT

An information processing apparatus includes an acquisition unit acquiring a first image and a second image, the first image being an image of a target area in an initial state, the second image being an image of the target area where a first object conveyed from a supply area is placed, an estimation unit estimating one or more second areas in the target area, based on a feature of a first area estimated using the first image and the second image, the first area being where the first object is placed, the one or more second areas each being an area where an object in the supply area can be placed and being different from the first area. A control unit controls a robot to convey a second object different from the first object from the supply area to any of the one or more second areas.

21 Claims, 22 Drawing Sheets

(58) Field of Classification Search
CPC ........... H04N 5/23299; G06K 9/00375; G06K 9/00664
See application file for complete search history.

(56) References Cited

U.S. PATENT DOCUMENTS

| | | |
|---|---|---|
| 9,751,693 B1 * | 9/2017 | Battles .................. B25J 9/0093 |
| 2007/0216332 A1 | 9/2007 | Lambert |
| 2016/0253562 A1 | 9/2016 | Yuki |
| 2017/0322537 A1 | 11/2017 | Su |
| 2018/0354121 A1 * | 12/2018 | Sezaki .................. B25J 9/1694 |
| 2019/0091870 A1 * | 3/2019 | Hino .................. G06K 9/00664 |
| 2019/0101885 A1 * | 4/2019 | Oya ........................ B25J 9/1697 |
| 2020/0030978 A1 * | 1/2020 | Diankov ................ B25J 9/1697 |
| 2020/0074692 A1 * | 3/2020 | Ooba ........................ G06T 7/74 |
| 2021/0233228 A1 * | 7/2021 | Yamaguchi ........... G06T 1/0014 |
| 2021/0268659 A1 * | 9/2021 | Olmstead ............. H04N 13/221 |

FOREIGN PATENT DOCUMENTS

| | | |
|---|---|---|
| CN | 106945035 A | 7/2017 |
| CN | 107932517 A | 4/2018 |
| DE | 10-2006-003859 B3 | 3/2007 |
| DE | 10-2009-011294 A1 | 9/2010 |
| DE | 10-2010-022357 B4 | 7/2014 |
| DE | 10-2017-113818 A1 | 1/2018 |
| EP | 2998076 A1 | 3/2016 |
| EP | 2998077 A2 | 3/2016 |
| JP | 2012-30320 A | 2/2012 |

\* cited by examiner

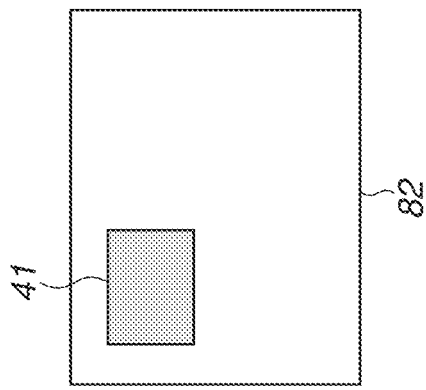
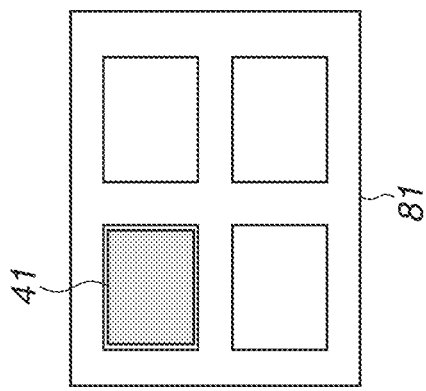
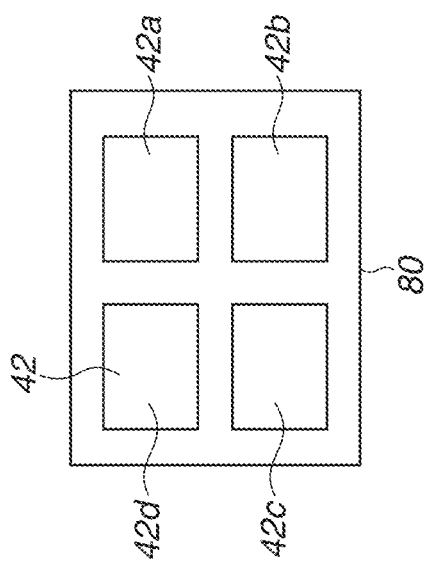

INFORMATION PROCESSING APPARATUS, INFORMATION PROCESSING METHOD, AND SYSTEM

BACKGROUND

Field

The present disclosure relates to a technique for controlling a robot that places an object.

Description of the Related Art

Automated factories have been using robots that perform, for example, work of packing components instead of a person. Conventionally, as a method for controlling robots for an operation to repeatedly place components in an aligned manner on a pallet, robot control programs are used or a remote operation is performed by a user. Japanese Patent Application Laid-Open No. 2012-30320 discusses a robot that learns correspondence relationships between trays and types of components to be placed on the trays, so that the robot can hold a component even if there is a change in positional relationships between the trays and the components.

In Japanese Patent Application Laid-Open No. 2012-30320, since a user needs to set in advance the correspondence relationships between the trays and the types of components each to be placed on a different one of the trays, it takes time to complete setup of the robot that places the components.

SUMMARY

The present disclosure is directed to providing an information processing apparatus that efficiently teaches a robot how to place an object.

According to an aspect of the present disclosure, an information processing apparatus for a controlling a robot is provided. An acquisition unit is configured to acquire a first image and a second image, the first image being an image of the target area in an initial state, the second image which is an image of the target area where a first object conveyed from the supply area is placed. An estimation unit is configured to estimate one or more second areas in the target area, based on a feature of a first area estimated using the first image and the second image, the first area being where the first object is placed, the one or more second areas each being an area an object in the supply area can be placed and being different from the first area. A control unit is configured to control the robot to convey a second object different from the first object from the supply area to any of the one or more second areas.

Further features will become apparent from the following description of exemplary embodiments with reference to the attached drawings.

BRIEF DESCRIPTION OF THE DRAWINGS

FIGS. 9A, 9B, and 9C are diagrams illustrating a method for estimating candidates for placement areas.

DESCRIPTION OF THE EMBODIMENTS

Figure 1:
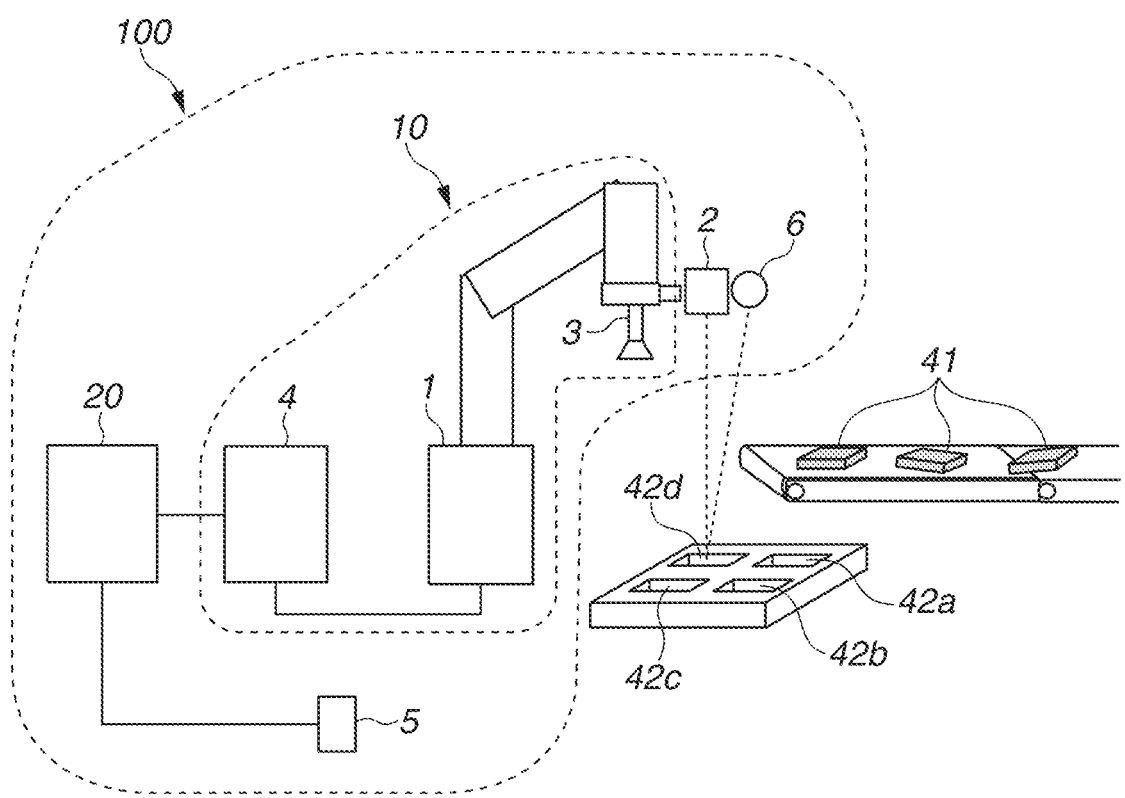
FIG. 1 is a diagram illustrating an example of a configuration of an information processing system.

With reference to the attached drawings, suitable exemplary embodiments of the present disclosure will be described below.

In a conventional factory, rearranging components and replacing components are manually performed. In recent years, there is a technique in which robots pack and replace components instead of a person. By using the technique, an improvement in productivity and a reduction in the burden on workers at a factory site has been expected. Meanwhile, it is necessary to teach robots an operation for recognizing a direction of a component and placing the component at a correct position or in a correct orientation. Since preparing programs or performing a remote operation require specialist knowledge, it has been difficult to perform a setup of robots at the factory site. Further, for example, even if a user exemplifies, to a robot, a task of moving an object, it is difficult for the robot to move remaining objects as exemplified by the user. In the present exemplary embodiments, a description is given of an information processing apparatus for generating a control value with which the robot conveys an object from a supply area to a target area and places the object as a candidate for a placement area included in the target area, by using an image or a moving image which is a model operation indicated by a user and has been captured from the viewpoint of a robot. A task described herein is an operation for conveying a group of objects loaded in bulk to a target area, such as a tray, and placing the objects in an aligned manner in the target area. According to the present exemplary embodiments, the operation of conveying and placing an object and a movement are synonymous. The user only needs to actually execute this task once. Thus, the user can set up the robot without specialist knowledge. As a result, it is possible to efficiently teach the robot an operation for moving an object.

In a first exemplary embodiment, before a target object is moved to a target area, an imaging apparatus obtains an image by image-capturing the target area in an initial state. Next, a user is instructed to convey a target object to the target area. The imaging apparatus obtains an image of a scene in which a target object is placed in a placement area included in the target area. Then, based on the images of the target object before and after the movement, a control value with which the target objects remaining in a supply area are to be conveyed and placed in the placement areas included in the target area is generated. Using the generated control value, a robot performs a task for conveying the target objects to the placement areas included in the target area. The robot repeatedly executes the task until all the target objects in the supply area run out, or until there are no candidates for the placement areas in the target area.

In the present exemplary embodiment, a "robot" refers to a machine apparatus that includes an actuator and holds, conveys, and places a target object. A "target object" refers to an object as an operation target of a movement and a placement in a task performed by the robot. Specifically, a "target object" is an industrial component, such as a component of a digital camera. A "movement" refers to the process of picking up a target object from the position where the target object is supplied by a conveyor belt, conveying the target object to a placement position, and placing the target object at the placement position.

FIG. 1 is a diagram illustrating an example of the configuration of an information processing system 100 including an information processing apparatus 20 according to the present exemplary embodiment. FIG. 1 is an example of a device configuration, and does not limit the scope of application of the present disclosure.

The information processing system 100 includes a robot 10 and the information processing apparatus 20. The information processing system 100 further includes an imaging apparatus 2, a light source 6, and an instruction apparatus 5.

The robot 10 executes an operation for recognizing target objects 41 and placement areas 42, and an operation for conveying and placing the target objects 41 based on a control value presented by the information processing apparatus 20. The robot 10 is, for example, a multijoint robot that operates in production lines of factories. The robot 10 includes a manipulator 1 such as a robot arm, a holding device 3 such as a robot hand, and a controller 4 that controls the manipulator 1 and the holding device 3. Further, the robot 10 includes a position/orientation change mechanism capable of changing the position and orientation of the holding device 3 by changing the angles of the joints of the manipulator 1. The position/orientation change mechanism is driven by an electric motor. Alternatively, this mechanism is driven by an actuator that operates by fluid pressure such as hydraulic pressure or air pressure. This mechanism is driven according to operation instruction information output from the information processing apparatus 20. The robot 10 is not limited to the multijoint robot. The robot 10 may be a movable machine that can be subjected to numerical control (NC).

The manipulator 1 is configured to move the imaging apparatus 2 to capture an image of the target objects 41 from any position and orientation. The manipulator 1 is controlled based on an instruction from the controller 4 or a control value determined by the information processing apparatus 20. The manipulator 1 can be composed of, for example, a six-axis robot and can move the imaging apparatus 2 attached near the end effector of the robot 10.

The holding device 3 is a tool for the robot 10 to hold an object according to the type of the target objects 41. For example, the holding device 3 is a hand including a chuck mechanism that can be driven by a motor and capable of holding the target objects 41, or a hand using a suction pad that suctions the target objects 41 by air pressure. The holding device 3 described herein suctions the center of gravity of each target object 41 with a hand using an suction pad, to hold the object. The holding device 3 is attached to the manipulator 1 and replaceable in response to the type of the target objects 41. Further, the holding device 3 is not necessarily required, and may not be provided so long as the manipulator 1 can move the target objects 41. For example, in the case of an operation for pushing out the target objects 41, the robot 10 may be composed of a uniaxial cylinder, and may not include the holding device 3.

For example, when a target position to which the robot 10 moves a target object is input to the controller 4, the controller 4 determines a trajectory on which the robot 10 moves the target object to the target position from the current location. Specifically, the controller 4 is a robot controller accompanying the manipulator 1. Alternatively, the controller 4 may be a programmable logic controller (PLC), or may be any other apparatus capable of controlling the manipulator 1 and the holding device 3. As illustrated in FIG. 1, the controller 4 is installed near the robot 10. Alternatively, the controller 4 may be integrated with the manipulator 1, or may be installed in another area. The controller 4 controls the manipulator 1 and the holding device 3. When an image is captured, the controller 4 controls the manipulator 1 to be at and in target position and orientation so that the imaging apparatus 2 captures an image of the target objects 41 or the placement areas 42. Then, if the imaging apparatus 2 moves, the controller 4 sends an imaging command to the information processing apparatus 20, and the information processing apparatus 20 sends an imaging trigger to the imaging apparatus 2. Alternatively, the controller 4 sends an imaging command directly to the imaging apparatus 2 not via the information processing apparatus 20. The controller 4 also appropriately controls the light source 6 according to the capturing of an image. When a task is executed, the controller 4 controls the manipulator 1 to be at and in target position and orientation so that the holding device 3 holds a target object 41 based on a control value acquired from the information processing apparatus 20. Then, when the holding device 3 moves to a position and an orientation at and in which the holding device 3 can hold a target object 41, the controller 4 sends a holding trigger to the holding device 3.

The target objects 41 are objects to be conveyed by the robot 10. Specifically, the target objects 41 are industrial components, such as components of a digital camera, or packed completed products. The target objects 41 are supplied one after another by a conveyor belt, and one unit of the target objects 41 is conveyed by the robot 10. "One unit" refers to the combination of target objects 41 that can be placed in a tray at a time. The target objects 41 may or may not be located in a tray. Further, the target objects 41 may not be supplied by the conveyor belt, and may be supplied by another method such as an automatic guided vehicle (AGV).

Placement areas 42a, 42b, 42c, and 42d are candidates for placement areas in a target area to which the target objects 41 are to be moved. Since the robot 10 places the target objects 41 in an aligned manner, placement areas are different for the respective target objects 41. Specifically, if the first target object 41 is moved to the placement area 42a, the placement area 42a is filled with the target object 41. Thus, a placement area 42 of the second target object 41 is to be a position different from the placement area 42a of the first target object 41, i.e., any of the placement areas 42b, 42c, and 42d. The placement areas 42 differ depending on the tasks. For example, if the task is pick-and-place, the placement areas 42 are the positions where the target objects 41 are to be placed. The "pick-and-place" refers to the task of attaching a suction unit such as a suction pad to the end of a robot arm and conveying an object by suctioning the object. If the target objects 41 are screws, and the task is screwing, the placement areas 42 are positions to be screwed. If the target objects 41 are connectors, and the task is the insertion of the connectors, the placement areas 42 are the positions where the connectors are to be inserted.

The imaging apparatus 2 is a camera or a visual sensor including a sensor for detecting light or a photodiode. The imaging apparatus 2 captures an image of the target objects 41 and the target area 42. The "image" is, for example, a two-dimensional color image or a distance image. The imaging apparatus 2 outputs the acquired image to the information processing apparatus 20. The imaging apparatus 2 captures an image of the target objects 41 and the target area 42 onto which the light source 6 projects light. The imaging apparatus 2 can also capture an image of the target objects 41 and other target objects 41 while the light source 6 does not project light. As a method for capturing a distance image, a light coding method for causing the imaging apparatus 2 to read an infrared light pattern projected by the light source 6 and obtaining distance information based on the principle of triangulation is used. Alternatively, a time-of-flight (ToF) method for obtaining distance information from the time until a projected infrared pulse is reflected and returns may be used. Yet alternatively, a method for obtaining distance information from parallax information using a stereo camera based on the principle of triangulation may be used, or another method may be used. As illustrated in FIG. 1, the imaging apparatus 2 and the light source 6 are mounted on the robot 10. Alternatively, the imaging apparatus 2 and the light source 6 may be fixedly placed in an upper portion of an imaging target space, or may be mounted on another operation machine.

Alternatively, a plurality of imaging apparatuses 2 may be provided. In a case where the fixed imaging apparatus 2 is used, the angle of view of the imaging apparatus 2 may enable the imaging apparatus 2 to capture an image of a supply area and the target area 42 at a time. In a case where the plurality of imaging apparatuses 2 is used, the installation location of each imaging apparatus 2 may be determined based on an area to be captured by each imaging apparatus 2. In the present exemplary embodiment, the position and orientation and the angle of view of the imaging apparatus 2 are known.

From the information processing system 100, the instruction apparatus 5 instructs the user to move the target objects 41 to any of candidates for placement areas in the target area 42. For example, the instruction apparatus 5 includes a loudspeaker and gives the instruction to the user by outputting natural language specified by an instruction unit 202. Alternatively, the instruction apparatus 5 includes a display and gives the instruction to the user by displaying a graphical user interface (GUI). Yet alternatively, the instruction apparatus 5 includes a projector and gives the instruction to the user by projecting an image specified by the instruction unit 202 onto the target objects 41 or the target area 42. Yet alternatively, the instruction apparatus 5 includes a head-mounted display (HMD) or augmented reality (AR) glasses and gives the instruction to the user by displaying an image in a superimposed manner on the target area 42 in real space or virtual space using mixed reality (MR), AR, or virtual reality (VR).

The light source 6 includes, for example, a projector and emits visible light or emits infrared light from a laser light source, to project uniform illuminating light or pattern light onto the target objects 41 and the target area 42.

Figure 2:
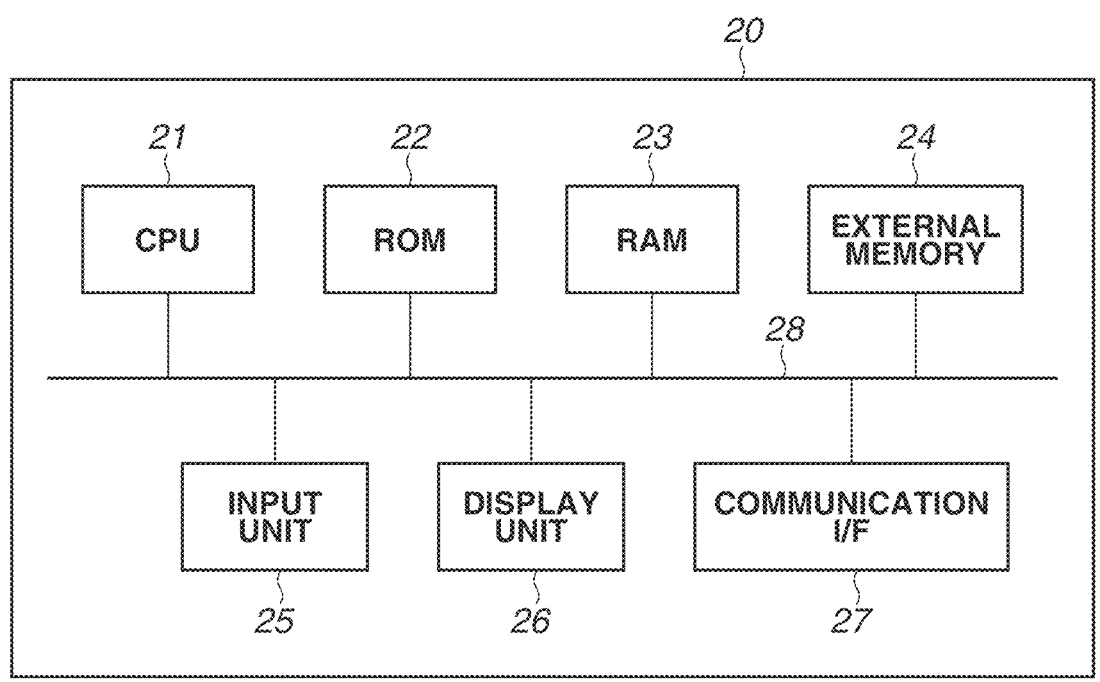
FIG. 2 is a diagram illustrating an example of a hardware configuration of an information processing apparatus.

The information processing apparatus 20 is an apparatus that generates a control value with which the robot 10 conveys an object from the supply area to the target area 42. The information processing apparatus 20 includes, for example, a personal computer (PC). FIG. 2 is an example of the hardware configuration of the information processing apparatus 20. The information processing apparatus 20 includes a central processing unit (CPU) 21, a read-only memory (ROM) 22, a random-access memory (RAM) 23, an external memory 24, an input unit 25, a display unit 26, a communication interface (I/F) 27, and a system bus 28. The CPU 21 performs overall control of the operation of the information processing apparatus 20 and controls the components (21 to 27) via the system bus 28. The ROM 22 is a non-volatile memory for storing a program necessary for the CPU 21 to execute processing. Alternatively, this program may be stored in the external memory 24 or an attachable storage medium (not illustrated). The RAM 23 functions as a main memory or a work area for the CPU 21. That is, when executing processing, the CPU 21 loads a necessary program from the ROM 22 into the RAM 23 and executes the loaded program, to achieve various functional operations. For example, the external memory 24 stores various types of data and various types of information that are necessary when the CPU 21 performs processing using a program. Further, for example, the external memory 24 stores various types of data and various types of information obtained by the CPU 21 performing processing using a program. The input unit 25 includes, for example, a pointing device such as a keyboard and a mouse and enables the user to give an instruction to the information processing apparatus 20 using the input unit 25. The display unit 26 includes a monitor such as a liquid crystal display (LCD). The communication I/F 27 is an interface for communicating with an external device. The system bus 28 connects the CPU 21, the ROM 22, the RAM 23, the external memory 24, the input unit 25, the display unit 26, and the communication I/F 27 so that these components can communicate with each other. As described above, the information processing apparatus 20 is connected to the robot 10, the imaging apparatus 2, the light source 6, the instruction apparatus 5, and the confirmation apparatus 7 as external devices via the communication I/F 27 so that the information processing apparatus 20 can communicate with each external device. The information processing apparatus 20 controls the operations of these external devices.

Figure 3:
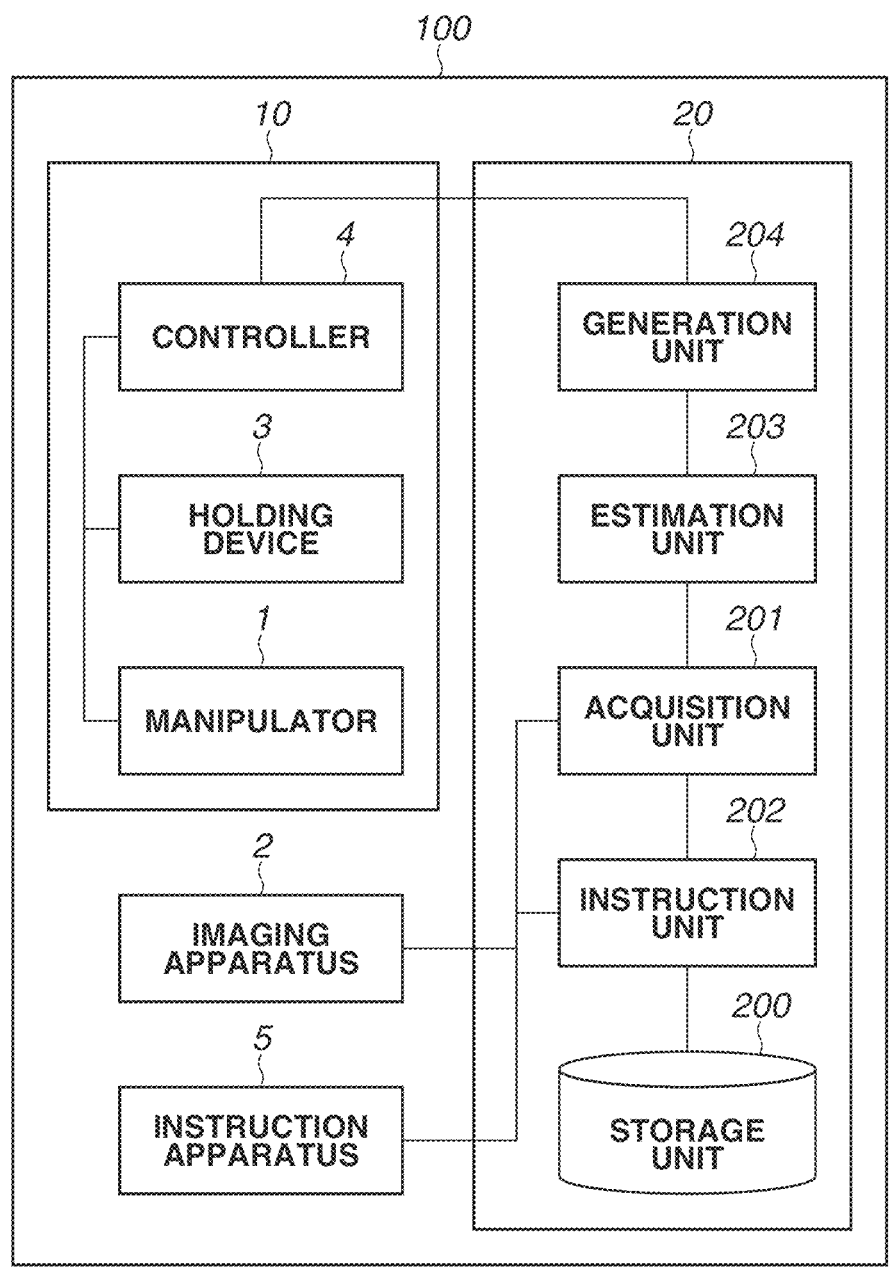
FIG. 3 is a block diagram illustrating an example of a functional configuration of the information processing system.

FIG. 3 is a block diagram illustrating examples of the functional configurations of the information processing system 100 and the information processing apparatus 20. The robot 10 includes the controller 4, the holding device 3, and the manipulator 1. The information processing apparatus 20 includes a storage unit 200, an acquisition unit 201, an instruction unit 202, an estimation unit 203, and a generation unit 204.

The storage unit 200 stores information necessary for the robot 10 to execute a learned task. Specifically, the information is data such as the position and orientation of the imaging apparatus 2 when capturing an image of the target area 42 or the supply area. The storage unit 200 also stores the angle of view of the imaging apparatus 2. Further, the storage unit 200 stores data regarding the area and the size of a hand of the holding device 3. Specifically, in a case where the holding device 3 is a suction pad, the storage unit 200 stores information regarding the diameter of the pad. In a case where the holding device 3 is a hand, the storage unit 200 stores information regarding the size of the hand. Further, the storage unit 200 also stores information regarding the holding position of each target object 41. For example, in the case of the suction pad, the information indicates that the center of the target object 41 is the holding position. This information does not need to be set with respect to each type of the target objects 41.

The acquisition unit 201 acquires visual information that is an image or a moving image obtained by the imaging apparatus 2 capturing an image of a scene including the target area 42 or the supply area. First, the acquisition unit 201 acquires first visual information obtained by capturing an image of the target area 42 in an initial state. Next, the acquisition unit 201 acquires second visual information obtained by capturing an image of the target area 42 in the state after one unit (a first object) of the target objects 41 is moved to the target area 42. By obtaining the difference between the feature points of the images based on the first visual information and the second visual information, it is possible to estimate texture information indicating an area having the target objects 41. Using the texture information, it is possible to perform the task of regularly arranging the target objects 41 in the target area 42. Further, the acquisition unit 201 acquires visual information (third visual information) that is an image or a moving image obtained by capturing an image of a scene including the supply area having one or more target objects 41. From the third visual information, it is possible to recognize target objects 41 that can be picked up, and determine the position where each object is to be held. The acquisition unit 201 outputs the acquired visual information to the instruction unit 202 and the estimation unit 203. The acquisition unit 201 is composed of, for example, a capture board or a memory (a RAM). Further, the acquisition unit 201 acquires the position and orientation (a first position) of the imaging apparatus 2 when capturing an image of the target area 42, and the position and orientation (a second position) of the imaging apparatus 2 when capturing an image of a scene including the supply area where the target objects 41 are loaded in bulk. In the present exemplary embodiment, the first and second positions are stored in advance in the storage unit 200.

The instruction unit 202 instructs the user to perform a predetermined operation. The "predetermined operation" is the operation of moving one unit (the first object) of the target objects 41 loaded in bulk in the supply area to any of the areas 42a, 42b, 42c, and 42d in the target area 42. In the specific processing, the instruction unit 202 acquires from the acquisition unit 201 an image obtained by image-capturing the target area 42 and then sends an instruction trigger to the instruction apparatus 5 to instruct the user to move the target objects 41 to the target area 42. In response to the instruction apparatus 5, the instruction unit 202 determines the content of the instruction. For example, in a case where the instruction apparatus 5 is a loudspeaker, the instruction unit 202 determines the content of voice guidance to be output from the loudspeaker. In a case where the instruction apparatus 5 is a projector, the instruction unit 202 determines an image to be projected. In a case where the instruction apparatus 5 is an HMD or AR glasses, the instruction unit 202 determines the content to be displayed in a superimposed manner.

Based on the difference between the first visual information and the second visual information acquired from the acquisition unit 201, the estimation unit 203 estimates a first area having the target objects 41 (a first estimation). Further, based on the first area, the estimation unit 203 estimates a plurality of second areas which are included in the target area 42 and different from the first area (a second estimation). Further, the estimation unit 203 performs template matching between an image feature, included in a subtraction image obtained using the first visual information and the second visual information, and the third visual information, to estimate the position where a target object 41 is to be held (a third estimation). In the first estimation, using the feature of an area where a change occurs between the first visual information and the second visual information, i.e., an area where the target objects 41 has been placed by the user, the estimation unit 203 estimates an area to which the target objects 41 are to be conveyed by the holding device 3. In this case, the estimation unit 203 estimates a three-dimensional area of the target objects 41. Specifically, the estimation unit 203 obtains the difference between the feature points of images from the first visual information and the second visual information, to acquire two-dimensional texture information. Further, using the result of measuring a distance, the estimation unit 203 obtains height information regarding the object. When the object is held and released, the estimation unit 203 estimates the position and orientation of the holding device 3 using the actual height information.

In the second estimation, based on the feature of a subtraction image obtained from the first visual information and the second visual information, and the geometric feature of the target area 42, the estimation unit 203 estimates an area where the target objects 41 are to be placed in the target area 42. The detailed processing will be described below.

In the third estimation, the estimation unit 203 performs template matching between the third visual information obtained by capturing an image of the supply area and the feature of the area of a target object 41, to extract the target object 41. Further, the estimation unit 203 estimates the center of gravity in the area of the target object 41 as a candidate for the position where the target object 41 is to be held. In this case, the estimation unit 203 estimates the holding position by corresponding the type of the holding device 3 to the area of the target object 41. For example, in a case where the holding device 3 is a suction pad, the center of gravity of the target object 41 is the holding position. In a case where the holding device 3 is a hand, the end of the target object 41 is the holding position. Data of these correspondences is provided in advance in the information processing apparatus 20. Target position and orientation are obtained based on an image coordinate system in a captured image, but may be obtained by being transformed to another coordinate system.

Based on candidates for placement areas estimated from the area of the target objects 41 estimated based on the first visual information and the second visual information, and the holding positions of the target objects 41 present in the supply area, the generation unit 204 generates a control value with which the robot 10 is to convey each target object 41. That is, the generation unit 204 generates a control value for moving the manipulator 1 based on the position and orientation of the manipulator 1 when placing the target object 41. The generated control value is input to the controller 4. Based on the control value, the controller 4 controls the robot 10. Alternatively, a control unit (not illustrated) of the information processing apparatus 20 may control the robot 10. The detailed processing will be described below.

Figure 17:
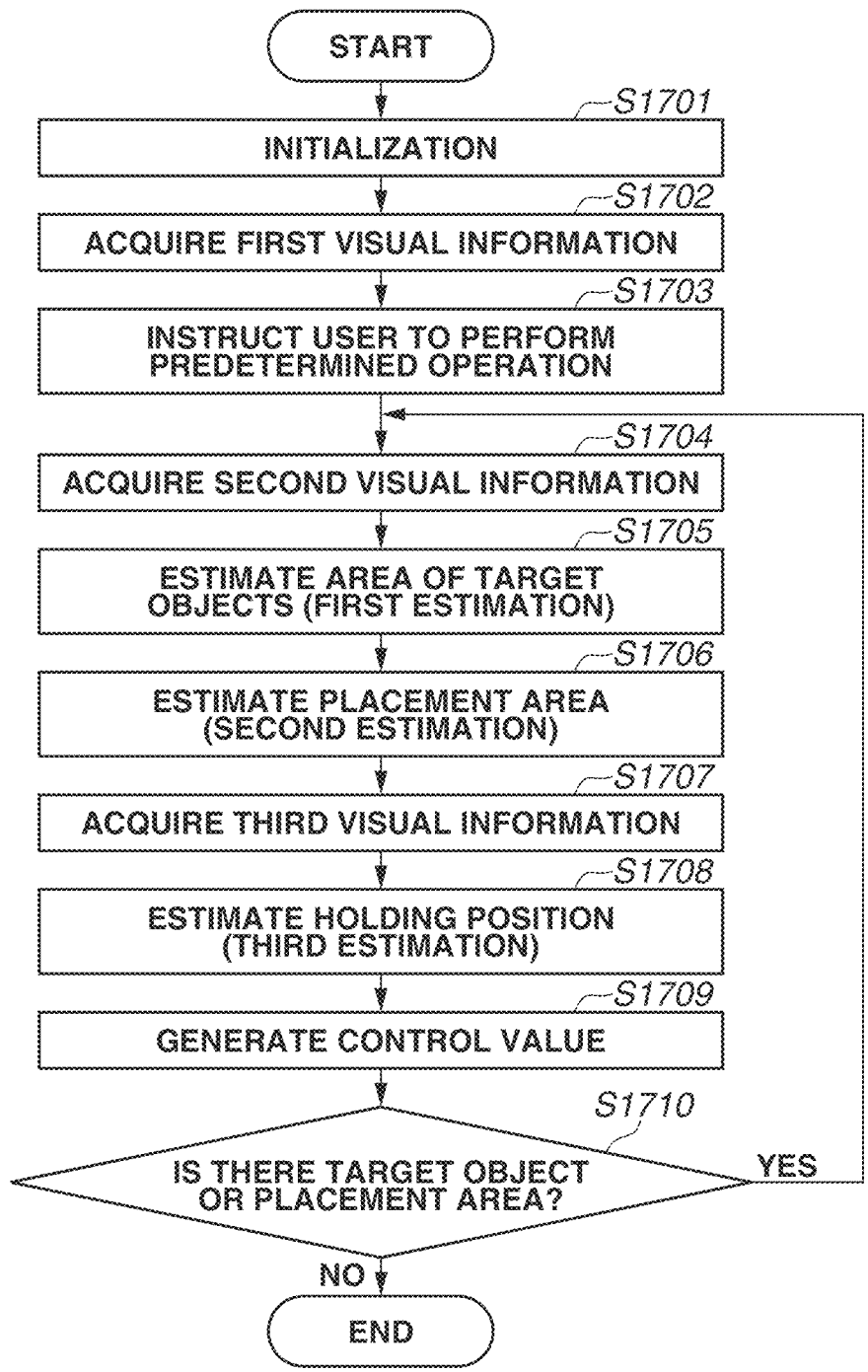
FIG. 17 is a flowchart illustrating processing executed by the information processing apparatus.

With reference to FIG. 17, processing executed by the information processing apparatus 20 is briefly described below. The detailed processing in the information processing system 100 will be described with reference to flowcharts. In step S1701, the CPU 21 initializes parameters set in the information processing apparatus 20. In step S1702, the acquisition unit 201 acquires first visual information obtained by capturing an image of the target area 42 in an initial state. In step S1703, the instruction unit 202 instructs the user to execute a predetermined operation. In step S1704, the acquisition unit 201 acquires second visual information obtained by capturing an image of the target area 42 after the user executes the predetermined operation. In step S1705, based on the first visual information and the second visual information, the estimation unit 203 estimates the area of the target objects 41 (a first estimation). In step S1706, based on the second visual information obtained by capturing an image of the area of the objects 41 and the target area 42, the estimation unit 203 estimates the position where a next target object 41 is to be placed (a second estimation). In step S1707, the acquisition unit 201 acquires third visual information obtained by capturing an image of the supply area where the target objects 41 are loaded in bulk. In step S1708, the estimation unit 203 estimates the position where the holding device 3 is to hold a target object 41 to be conveyed (a third estimation). In step S1709, based on the holding position and the placement area, the generation unit 204 generates a control value with which to convey the target object 41. In step S1710, the generation unit 204 determines whether a target object 41 remains in the supply area, or a placement area remains in the target area 42. If a target object 41 or a placement area remains (YES in step S1710), the processing returns to step S1704. In step S1704, a similar task is continued. If neither a target object 41 nor a placement area remains (NO in step S1710), the processing ends.

Figure 4:
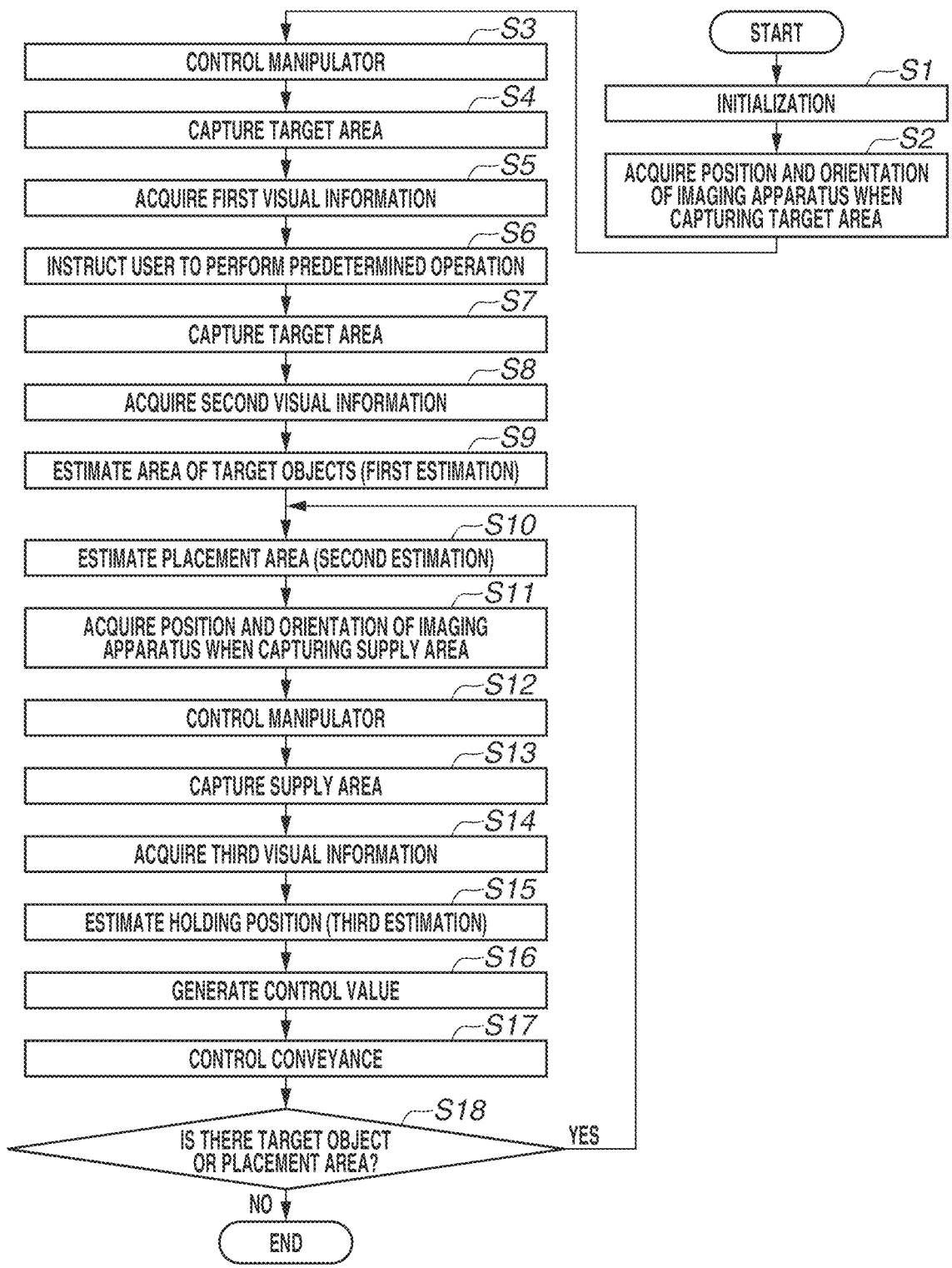
FIG. 4 is a flowchart illustrating processing executed by the information processing system.

Processing executed by the information processing system 100 is described in detail. FIG. 4 is a flowchart illustrating a processing procedure executed by the information processing system 100. The processing illustrated in FIG. 4 is achieved by the CPU 21 of the information processing apparatus 20 illustrated in FIG. 2 reading a program stored in the ROM 22 or the external memory 24 and executing the program. However, part or all of the processing in FIG. 4 may be achieved by a dedicated hardware. The processing in FIG. 4 is started, for example, when an operator starts the information processing system 100. The timing of the start of the processing, however, is not limited to when the information processing system 100 starts.

First, in step S1, the CPU 21 performs an initialization process for initializing the system. That is, the CPU 21 loads a program stored in the ROM 22 or the external memory 24 into the RAM 23 so that the program can be executed. Further, the CPU 21 reads parameters of the devices connected to the information processing apparatus 20 and returns the devices to initial positions so that the devices can be used. Specifically, the acquisition unit 201 acquires the initial position and orientation and the angle of view of the imaging apparatus 2 from the storage unit 200. Further, the acquisition unit 201 reads data of the size and the area of a holding portion of the holding device 3. In a case where the holding portion is an adsorption pad, the data of the holding device 3 is data of the diameter of the pad. Also in step S1701 in FIG. 17, a similar process is performed.

Next, in step S2, the acquisition unit 201 acquires the position and orientation of the imaging apparatus 2 when capturing an image of the target area 42. The manipulator 1 moves, whereby the imaging apparatus 2 captures an image of the target area 42 from a first position. Alternatively, the controller 4 acquires the first position. The position and orientation may be determined by any method so long as the target area 42 can be image-captured.

In step S3, the controller 4 controls the manipulator 1 to move to the first position where the imaging apparatus 2 captures an image. Specifically, the controller 4 determines a control value with which the manipulator 1 moves the robot 10 in the position and orientation acquired in step S2. For example, to move the robot 10 by the manipulator 1 to the position and orientation generated in step S2, first, the controller 4 converts position/orientation information corresponding to the position, where an image of the target area 42 is to be captured, into joint angle information regarding the manipulator 1 by forward kinematics. Next, the controller 4 calculates command values with which the actuators of the joints of the manipulator 1 move, and inputs the command values to the robot controller. Then, based on the input command values, the manipulator 1 operates. The positional relationship between the imaging apparatus 2 and the manipulator 1 is calibrated in advance.

In step S4, the controller 4 sends an imaging command to the information processing apparatus 20, and the information processing apparatus 20 sends an imaging trigger to the imaging apparatus 2. Based on the imaging trigger, the imaging apparatus 2 captures an image of a scene including the target area 42 in an initial state. The image obtained in this process is referred to as "first visual information". In this process, no target object 41 is in the target area 42 (the initial state). Alternatively, one or more target objects 42 may be placed in the target area 42.

In step S5, the acquisition unit 201 acquires the first visual information obtained by capturing an image of the target area 42 in the initial state and sends the first visual information to the instruction unit 202. The "initial state" refers to the state before the user teaches a task. Also in step S1702 in FIG. 17, a similar process is performed.

In step S6, by a predetermined method, the instruction unit 202 instructs the user to perform a predetermined operation for moving one unit of the target objects 41 from the supply area to the target area 42. The instruction unit 202 acquires from the acquisition unit 201 the first visual information obtained by capturing an image of the target area 42 in the state before the target objects 41 are conveyed to the target area 42. Then, using the instruction apparatus 5, the instruction unit 202 instructs the user to move the target objects 41 to the target area 42. As an example, a case is described where the task of placing the target objects 41 from an area to which the target objects 41 are supplied by a conveyor belt into a tray. According to the present exemplary embodiment, the unit of the target objects 41 to be moved by the user is a single target object 41. Alternatively, a plurality of target objects 41 may be treated as one unit. As a method for giving the instruction to the user, for example, voice, a GUI, projection, MR, AR, or VR is used. In the case of voice, the loudspeaker outputs an announcement urging the user to convey the target objects 41 to the target area 42. Also in step S1703 in FIG. 17, a similar process is performed.

Figure 5:
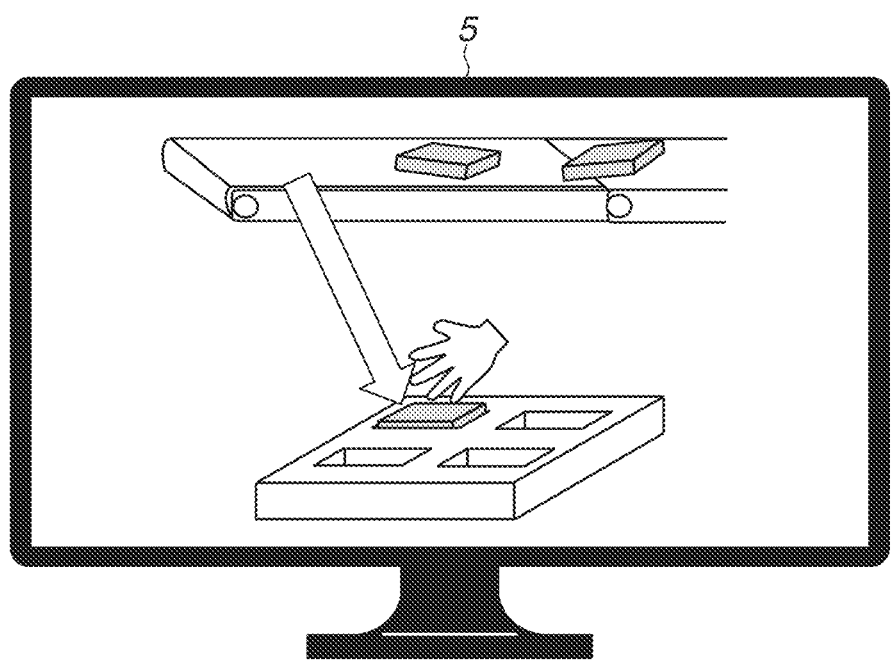
FIG. 5 is a diagram illustrating an example of a method for giving an instruction to a user.
Figure 6:
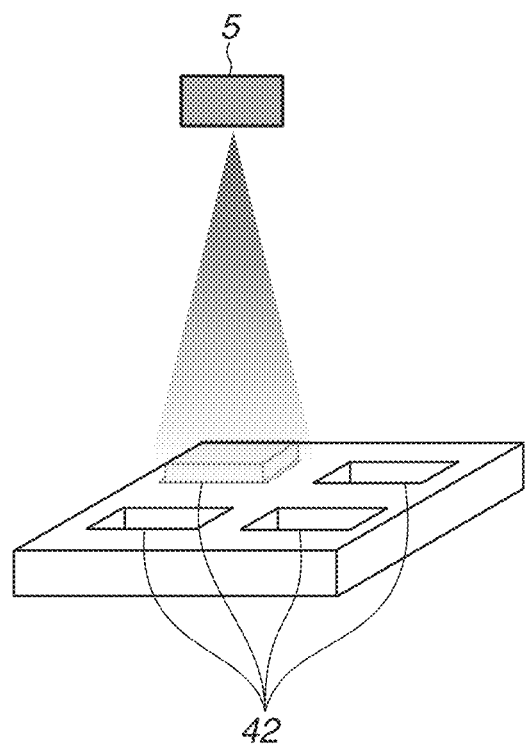
FIG. 6 is a diagram illustrating an example of a method for giving an instruction to the user by projection.
Figure 7:
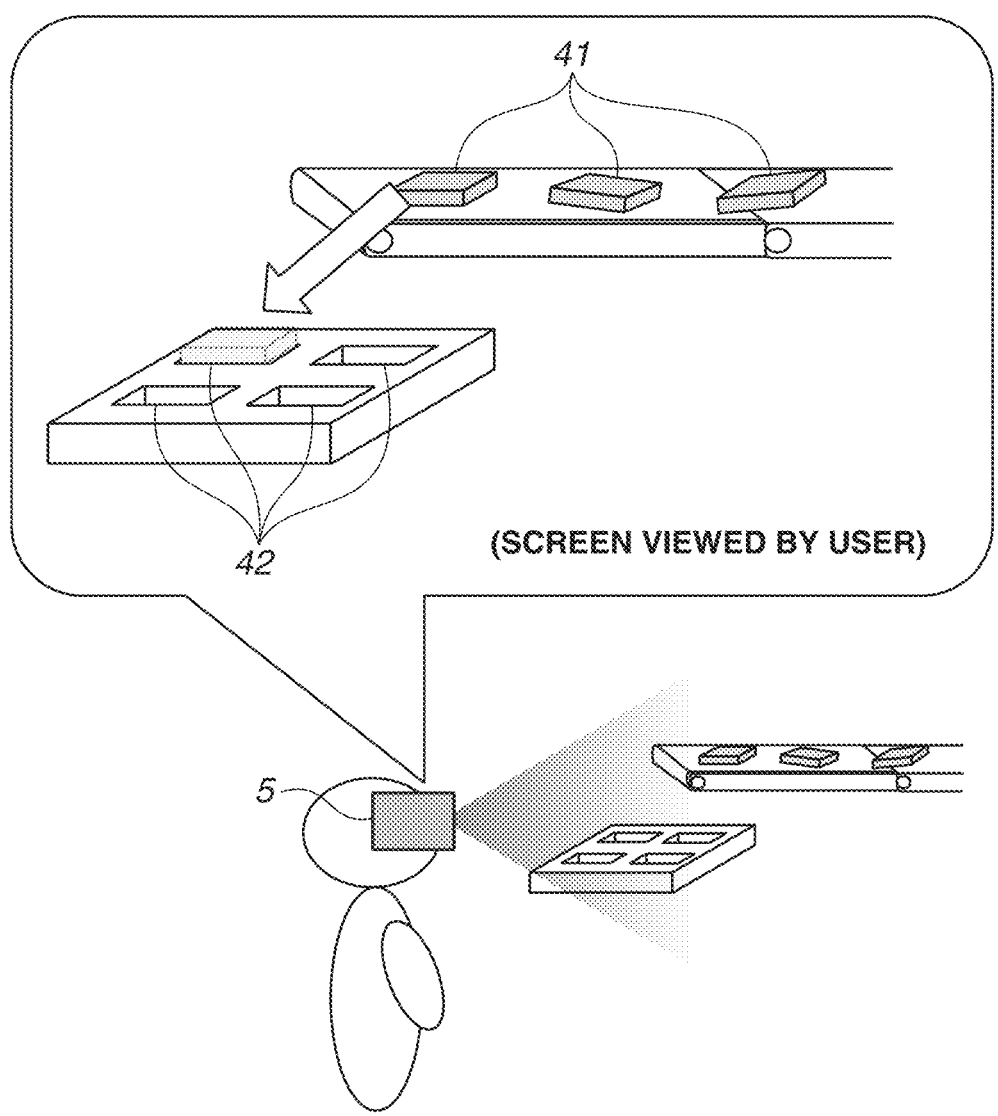
FIG. 7 is a diagram illustrating display using virtual reality.

In the case of a GUI as in FIG. 5, the GUI indicates on the display that the user should move the target objects 41 to the target area 42. The GUI displays on the instruction apparatus 5 an illustration representing an arrow that urges the user to move the target objects 41 from the supply area to the target area 42. Alternatively, character information "please move objects from supply area to target area" is displayed. This is easily understandable for the user because the user can confirm the operation on the screen. In the case of projection as in FIG. 6, a projector projects an image of the target objects 41 on the target area 42, or projects character information. The user has the advantage of working while viewing the real thing. In the case of MR, AR, or VR as in FIG. 7, an image of the target objects 41 is displayed in a superimposed manner on the target area 42 in real space or virtual space using an HMD or AR glasses, or character information is displayed.

In step S7, the imaging apparatus 2 captures an image of a scene including the target area 42 having one unit of the target objects 41 placed by the user. In step S4, no target object 41 is yet placed in the target area 42, whereas in step S7, one unit of the target objects 41 is placed in the target area 42 by the user. In step S7, the imaging apparatus 2 may capture an image of the scene after the user finishes moving the target objects 41. Alternatively, the imaging apparatus 2 may continue to capture an image of the scene after the user starts moving the target objects 41. Yet alternatively, the imaging apparatus 2 may continue to capture an image of the scene after the user is instructed to move the target objects 41. The imaging apparatus 2 may continue to capture an image of the scene from a timing other than these timings. The completion of the movement is determined based on the user's operation of inputting a trigger (uttering words such as "OK" or pressing a predetermined button) to the instruction apparatus 5. Alternatively, the system can make the determination (perform image recognition on the motion of a person or an object, follow the motion, and divide the motion by time). Such movement completion is input to the system, whereby it is possible to safely work.

Figure 8A:
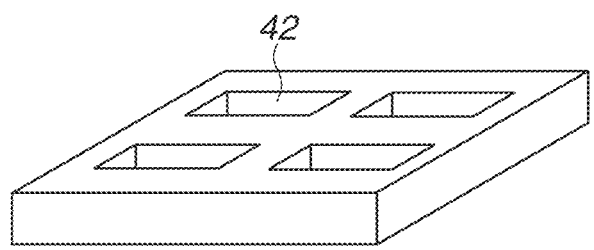
FIGS. 8A and 8B are diagrams illustrating an example of a method for determining a target object.
Figure 8B:
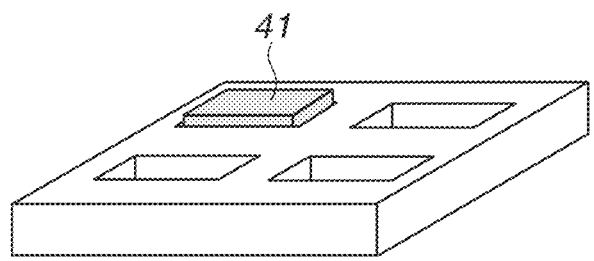

In step S8, the acquisition unit 201 acquires second visual information obtained by capturing an image of the state of the target area 42 after the user performs the predetermined operation. For example, FIG. 8A illustrates the initial state, and FIG. 8B illustrates the state in which the target objects 41 are placed by the user. An image of the scene captured as the second visual information includes the placement area 42a having one unit of the target objects 41 placed by the user. The second visual information is sent to the estimation unit 203. Also in step S1704 in FIG. 17, a similar process is performed.

In step S9, based on the first visual information acquired in step S5 and the second visual information acquired in step S8, the estimation unit 203 estimates an area (a first area) having the target objects 41 are placed (a first estimation). In this process, the first area matches the shape of an object that can be recognized when the object is viewed from above. As a method for estimating the area of the object, for example, background subtraction is performed between images before and after the target objects 41 are placed in any placement area included in the target area 42, i.e., the first visual information and the second visual information. As in FIGS. 8A and 8B, when the target objects 41 are placed in the target area 42, and if the imaging apparatus 2 captures an image from above the target area 42, the estimation unit 203 acquires a subtraction image as in an image 82 in FIG. 9C before and after the target objects 41 are conveyed to the target area 42. In this processing, the estimation unit 203 calculates the target objects 41 by obtaining the difference between an image 81 (the second visual information) after the conveyance and an image 80 (the first visual information) before the conveyance. The image 80 is the first visual information and is an image of the target area 42 before target objects 41 are placed. The image 81 is the second visual information and is an image obtained of the target area 42 having one unit of the target objects 41 placed by the user. In this case, a target object 41 is in an upper left area. However, the target object 41 may be placed in any of upper left, lower right, and upper right areas. The image 82 has the target object 41 and is obtained based on the difference between the images of the target area 42 before and after the target object 41 is moved. Specifically, texture information regarding the target objects 41 can be obtained using a color image, and the area of the upper surfaces of the target objects 41 and height information regarding the target objects 41 can be obtained using distance information. Based on these pieces of information, the estimation unit 203 estimates the area of the target objects 41. By estimating the area of the target objects 41 from the images, the user can easily perform a setup without area data of the target objects 41. Also in step S1705 in FIG. 17, a similar process is performed.

Figure 10A:
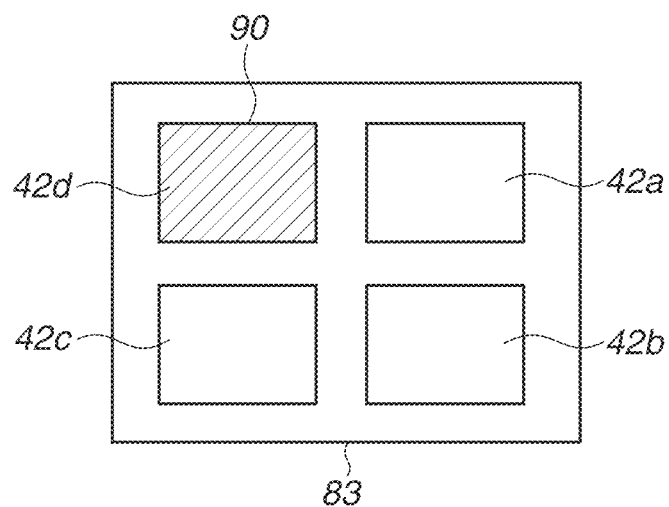
FIGS. 10A and 10B are diagrams illustrating relative positional relationships between target objects and placement areas.
Figure 10B:
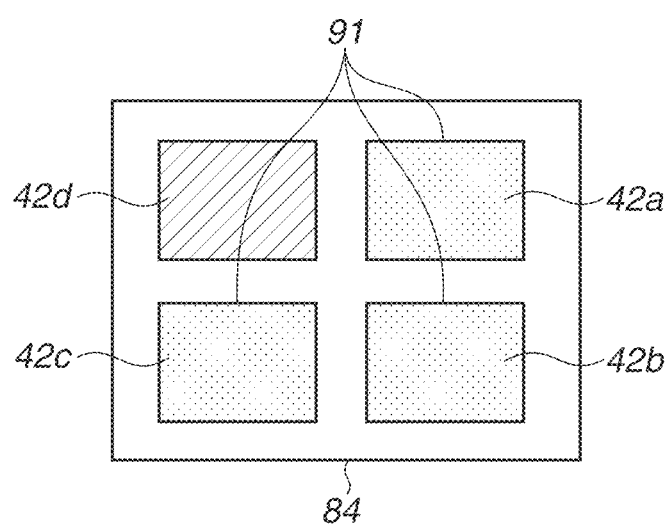
Figure 18:
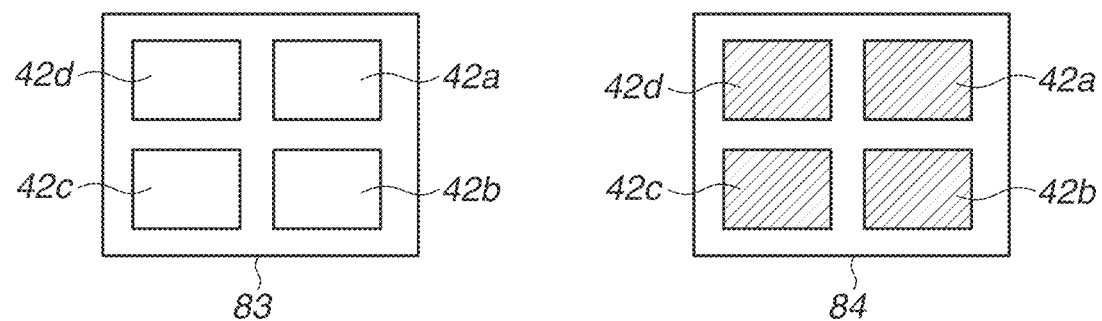
FIG. 18 is a diagram illustrating an example of training data for placement areas.

In step S10, based on the second visual information acquired in step S8 and the feature of the area of the target objects 41 estimated in step S9, the estimation unit 203 estimates a plurality of second areas different from the first area and where an object can be placed (a second estimation). The robot 10 according to the present exemplary embodiment executes the task of arranging target objects in an aligned manner in a target area. In this task, at the same position as that of the first target object placed by the user, another target object cannot be placed. That is, the next object needs to be placed at a different position from that of the first target object. FIGS. 10A and 10B are diagrams illustrating the process of estimating candidates for placement positions from an image. An image 83 is the second visual information, and a shaded portion 90 in the image 83 indicates an area where a target object 41 is placed. The shaded portion 90 is estimated using the image 82 in FIG. 9C, i.e., the image obtained by obtaining the difference between the first visual information and the second visual information. Next, in the first visual information, the image feature of the area corresponding to the shaded portion 90 is extracted. The extracted image feature is subjected to template matching with the first visual information. The center positions of areas that match the image feature extracted by this process are employed as candidates for placement areas. An image 84 is an image indicating the estimation result. The center points of partial areas indicated by areas 91 are served as the candidates for placement areas. The obtained partial areas are estimated as areas where target objects 41 are to be placed. In this case, the centers of the areas extracted from the target area 42 are estimated as placement areas. Further, as well as the template matching using the image feature, the following methods may be used. If depth information can be obtained by a depth camera, areas that match depth information about an area corresponding to an area having an object are estimated. Alternatively, the candidates for placement areas may be estimated by deep learning. Also in step S1706 in FIG. 17, a similar process is performed. As a method for estimating placement areas by deep learning, for example, learning is performed such that an image is input, and placement areas are output. FIG. 18 illustrates an input image for learning and a labeled image. In an image 83 in FIG. 18, areas 42a to 42d are placement areas. In a case where learning is performed in advance, then as in shaded portions 42a to 42d in an image 84 in FIG. 18, the user assigns, to the placement areas, labels indicating that target objects 41 can be placed. By learning the features of the labeled placement areas, then when a new image is input, it is possible to distinguish which area in the image is a placement area. Prior learning is not need to be provided to the system by the user. First, the results data of input images and placement areas is collected while the system is operated by a method using template matching as described above. Then, if sufficient data is collected, the learning may be performed. As a method for estimating areas, for example, a convolutional neural network (CNN) is used as a learning model. Further, the data collected for learning may not be used as it is, and may be subjected to data extension such as enlargement or reduction, gamma correction, or a translational or rotational movement.

Figure 11A:
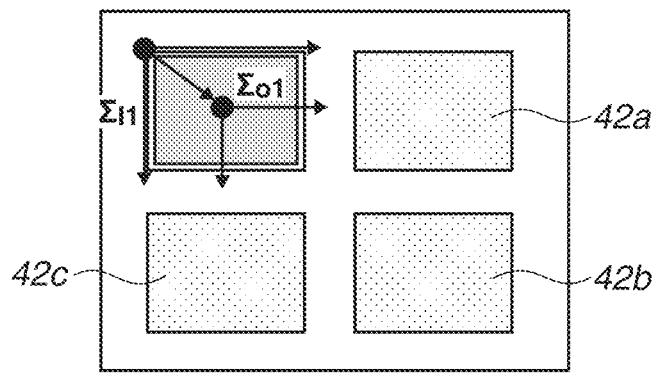
FIGS. 11A, 11B, and 11C are diagrams illustrating relative positional relationships between target objects and placement areas.
Figure 11B:
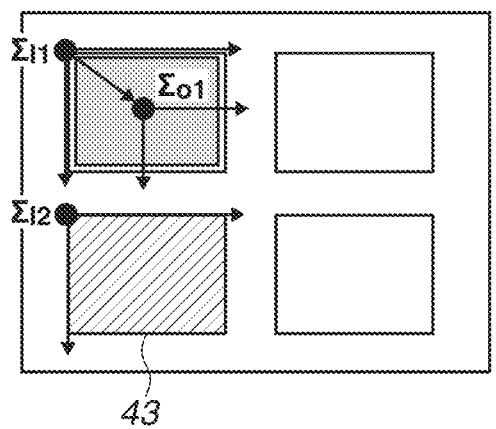
Figure 11C:
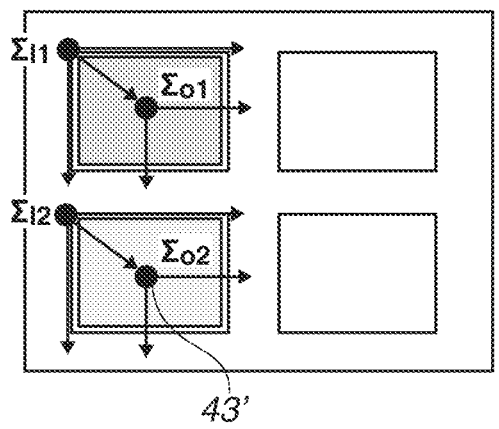

In step S11, the acquisition unit 201 acquires the position and orientation of the imaging apparatus 2 for capturing an image of a scene including the supply area where the target objects 41 are loaded in bulk. The acquired second position is sent to the controller 4. The position (and orientation) of the imaging apparatus 2 may be determined based on the result determined in step S9 using the visual information acquired in step S5 or S8, or may be determined by any method so long as an image of the target objects 41 can be captured. Further, based on the area of the target objects 41 estimated in step S9 and the areas where the target objects 41 are to be placed in the target area 42 that are estimated in step S10, the estimation unit 203 selects the positions where the target objects 41 to be conveyed by the robot 10 are to be placed. With reference to FIGS. 11A, 11B, and 11C, the process of step S15 is described. FIG. 11A illustrates a target area coordinate system $\Sigma_{t1}$ of the target area 42 to which a target object 41 is moved by the user, and a target object coordinate system $\Sigma_{o1}$ of the target object 41. In this case, the upper left of the target area 42 is the origin of the target area coordinate system $\Sigma_{t1}$, and the center of gravity of the target object 41 is the origin of the target object coordinate system $\Sigma_{o1}$. The origins, however, may be set in any areas. In this case, an area 43 where a target object 41 is to be placed next is obtained in step S10. Thus, a single portion is selected as a next placement area 43 from among areas having no target object 41. As a method for selecting the next placement area 43, the user sets the order of selecting the next placement area 43 one by one in advance. Alternatively, a rule that the next placement area 43 is selected in order from the upper left to the lower right is set. Yet alternatively, the next placement area 43 is randomly selected. The next placement area 43 may be selected by a method other than these methods. If the area 43 is selected, then similarly to the setting of the target area coordinate system $\Sigma_{t1}$, the origin of the area 43 is set ($\Sigma_{t2}$ in FIG. 11B). In this case, the target object 41 is to be placed at and in relatively the same position and orientation as those of the target area 42. As a result, a movement similar to a translational or rotational movement from the target area coordinate system $\Sigma_{t1}$ to the target object coordinate system $\Sigma_{o1}$ is considered regarding the target area coordinate system $\Sigma_{t2}$, whereby the relative position and orientation of the target object 41 to be conveyed next by the robot 10 relative to the target area coordinate system $\Sigma_{t2}$ are obtained ($\Sigma_{o2}$ in FIG. 11C). Based on the above, the position and orientation at and in which the target object 41 is to be placed are obtained. The obtained results are sent to the controller 4. Also in step S1707 in FIG. 17, a similar process is performed.

In step S12, to capture an image of the scene including the target objects 41 loaded in bulk in the supply area, the controller 4 controls the manipulator 1 to cause the imaging apparatus 2 to be at and in the position and orientation determined in step S11. In step S13, the imaging apparatus 2 captures an image of the target objects 41 loaded in bulk in the supply area. The image captured in this process is referred to as "third visual information". Using the third visual information, information regarding the positions and the orientations of the remaining target objects 41 is obtained. In step S14, the acquisition unit 201 acquires the third visual information about the target objects 41 of which image is captured by the imaging apparatus 2. The third visual information is sent to the estimation unit 203.

In step S15, the estimation unit 203 estimates the holding position where the holding device 3 holds a target object 41 (a second object) (a third estimation). The estimation unit 203 performs template matching between an image feature included in a subtraction image between the first visual information and the second visual information, and the third visual information, to estimate the holding position where the target object 41 is to be held. For example, in a case where the holding device 3 includes a suction-type suction pad, the holding device 3 can hold the target object 41 by suctioning the center of gravity of the target object 41. As a determination method for a position and orientation of when the target object 41 is held, the position and an orientation of the target object 41 may be set in advance for each target object 41. Alternatively, the user specifies the holding position using voice, a GUI, MR, AR, or VR. When suction is used for the holding, a flat surface area that can be suctioned is calculated. In the case of holding, parallel surfaces that can be held are obtained. Alternatively, the suction or holding position may be estimated by deep learning. For example, information about the target objects 41 and information about the holding device 3 (indicating the shape and the size of the holding portion) are input, and the holding or suction position is obtained using an image obtained by image-capturing the target objects 41. Specifically, first, based on the target objects 41 obtained in step S9 and preset information about the holding device 3, a label indicating which position in each target object 41 is to be suctioned or held, and how the target object 41 is to be suctioned or held is assigned to each pixel in an image of the target object 41, to generate learning data. The method for assigning the label may be manually performed in advance by the user, or may be automatically performed while the system is operated. Further, in a case where the holding of an object is failed, a label indicating that the holding of the object is failed is assigned to the holding position in the process. As a method for automatically assigning the label while the system is operated, every time a target object 41 is suctioned or held, information about which portion of the target object 41 is suctioned or held, and the success/failure result are collected as learning data, whereby a correct suction or holding position are labelled and learning data is generated. Then, learning is performed using the generated learning data, so that the adsorption or holding position is estimated. As a method for estimating the adsorption or holding position, for example, a CNN is used as a learning model. Learning using an image is applied to the estimation of the holding position, whereby it is possible to set a task more efficiently. The suction or holding position, however, may be estimated by a method other than the above described methods.

In step S16, the generation unit 204 generates a control value for the manipulator 1 with which an object among the target objects 41 in the supply area is conveyed to any of the second areas where one unit of the target objects 41 can be placed. Specifically, based on the holding position estimated in step S15 and the areas where the target objects 41 are to be placed that are estimated in step S10, the generation unit 204 generates a control value with which the remaining objects are conveyed. The control value is generated so that the target objects 41 are not conveyed to an area already having a target object 41.

Figure 12:
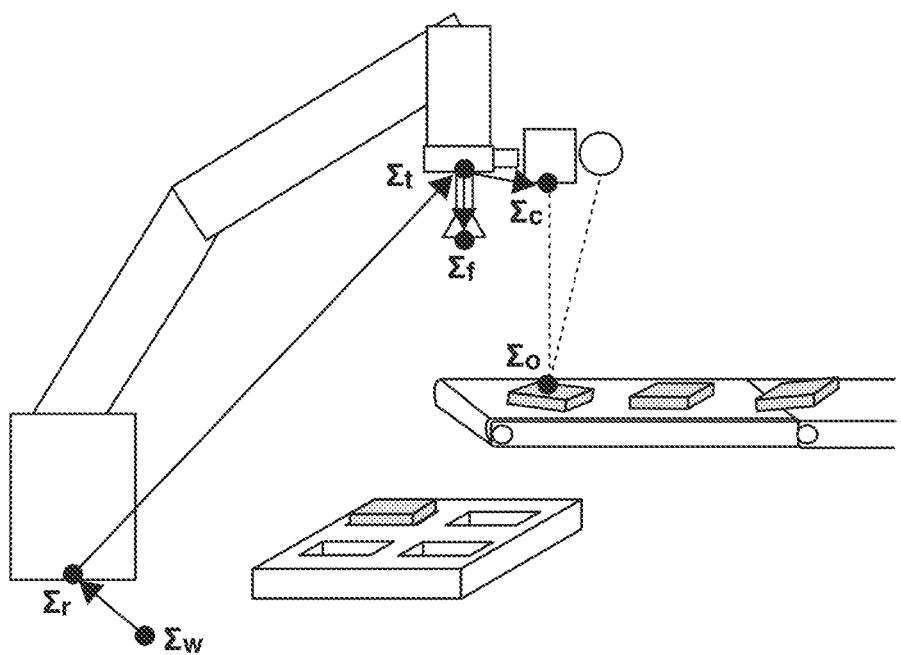
FIG. 12 is a diagram illustrating examples of coordinate systems of the information processing system.
Figure 13:
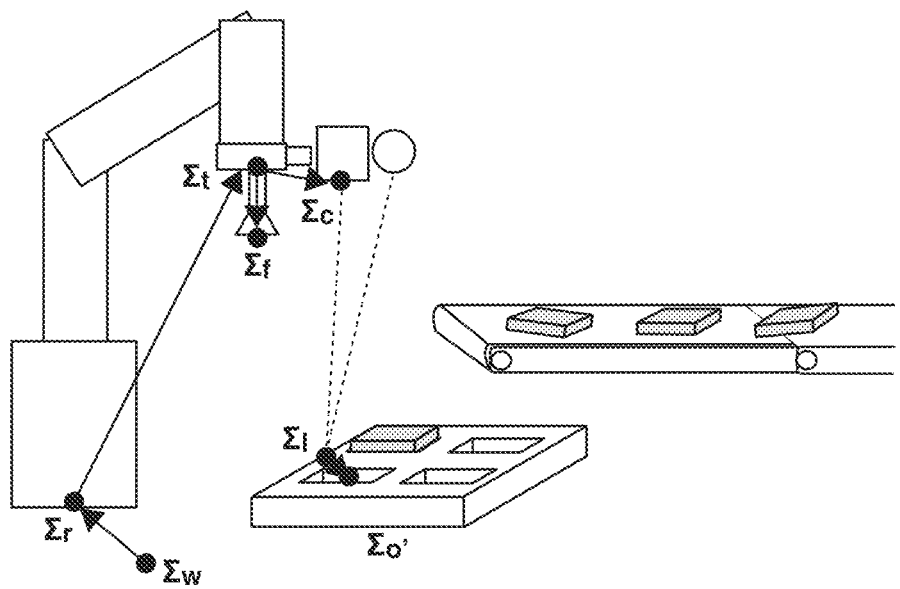
FIG. 13 is a diagram illustrating examples of the coordinate systems of the information processing system.

In this process, regarding the control value generated in step S16, it is necessary to transform the placement areas estimated in step S10 and the holding position estimated in step S15 to a robot coordinate system, to control the manipulator 1. FIGS. 12 and 13 are diagrams illustrating the relationships between coordinate systems. A coordinate system $\Sigma_c$ of the imaging apparatus 2, a coordinate system $\Sigma_r$ of the manipulator 1, an end coordinate system $\Sigma_t$ of the manipulator 1, a coordinate system $\Sigma_f$ of the holding device 3, a coordinate system $\Sigma_o$ of when a target object 41 is held, a coordinate system $\Sigma_{o'}$ of when the target object 41 is placed, and a coordinate system $\Sigma_1$ of the target area 42 are treated in a unified manner. As illustrated in FIG. 12, a world coordinate system $\Sigma_w$ is set as a reference coordinate system in a workspace. First, a displacement from the world coordinate system $\Sigma_w$ to the manipulator coordinate system $\Sigma_r$ is (RX, RY, RZ). Further, a 3×3 rotation matrix representing the orientation of the manipulator 1 is RM. A displacement from the manipulator coordinate system $\Sigma r$ to the manipulator end coordinate system $\Sigma_t$ is (TX, TY, TZ). Further, a 3×3 rotation matrix representing the orientation of the end of the manipulator 1 is TM. Further, a displacement from the manipulator end coordinate system $\Sigma_t$ to the coordinate system $\Sigma_f$ of the holding device 3 is (FX, FY, FZ). Further, a 3×3 rotation matrix representing the orientation of the end of the holding device 3 is FM. "The end of the holding device 3" refers to a portion where the holding device 3 comes into contact with the target object 41. A displacement from the manipulator end coordinate system $\Sigma_t$ to the imaging apparatus coordinate system $\Sigma_c$ is (CX, CY, CZ). Further, a 3×3 rotation matrix representing the orientation of the imaging apparatus 2 is CM. Further, a displacement from the imaging apparatus coordinate system $\Sigma_c$ to the target object coordinate system $\Sigma_o$ of the target object 41 is (OX, OY, OZ). Further, a 3×3 rotation matrix representing the orientation of the target object 41 is OM. In this case, the displacement of the target object 41 viewed from the world coordinate system $\Sigma_w$ is (WX, WY, WZ), and a 3×3 rotation matrix representing the orientation of the target object 41 is WM. In this case, when the holding device 3 attached to the end of the manipulator 1 is in contact with the target object 41, the displacement from the manipulator coordinate system $\Sigma_r$ to the manipulator end coordinate system $\Sigma_t$ is (TX1, TY1, TZ1). If the 3×3 rotation matrix representing the orientation of the end of the manipulator 1 is TM1, the following mathematical formula (1) holds.

$$\begin{pmatrix} & & & WX \\ & WM & & WY \\ & & & WZ \\ 0 & 0 & 0 & 1 \end{pmatrix} = \begin{pmatrix} & & & RX \\ & RM & & RY \\ & & & RZ \\ 0 & 0 & 0 & 1 \end{pmatrix} \cdot \begin{pmatrix} & & & TX_1 \\ & TM_1 & & TY_1 \\ & & & TZ_1 \\ 0 & 0 & 0 & 1 \end{pmatrix} \cdot \begin{pmatrix} & & & FX \\ & FM & & FY \\ & & & FZ \\ 0 & 0 & 0 & 1 \end{pmatrix} \quad (1)$$

$$W = R \cdot T_1 \cdot F$$

Further, when the imaging apparatus 2 captures an image of the target object 41, the displacement from the manipulator coordinate system $\Sigma_r$ to the manipulator end coordinate system $\Sigma_t$ is (TX2, TY2, TZ2). If the 3×3 rotation matrix representing the orientation of the end of the manipulator 1 is TM2, the following mathematical formula (2) holds.

$$\begin{pmatrix} & & & WX \\ & WM & & WY \\ & & & WZ \\ 0 & 0 & 0 & 1 \end{pmatrix} = \begin{pmatrix} & & & RX \\ & RM & & RY \\ & & & RZ \\ 0 & 0 & 0 & 1 \end{pmatrix} \cdot \begin{pmatrix} & & & TX_2 \\ & TM_2 & & TY_2 \\ & & & TZ_2 \\ 0 & 0 & 0 & 1 \end{pmatrix} \cdot \begin{pmatrix} & & & CX \\ & CM & & CY \\ & & & CZ \\ 0 & 0 & 0 & 1 \end{pmatrix} \cdot \begin{pmatrix} & & & OX \\ & OM & & OY \\ & & & OZ \\ 0 & 0 & 0 & 1 \end{pmatrix} \quad (2)$$

$$W = R \cdot T_2 \cdot C \cdot O$$

Since mathematical formulas (1) and (2) represent the position and orientation of the target object 41 in the world coordinate system $\Sigma_w$, mathematical formula (3) holds.

$$R \cdot T_1 \cdot F = R \cdot T_2 \cdot C \cdot O T_1 - T_2 \cdot C \cdot F^{-1} \quad (3)$$

When the position and orientation of the manipulator 1 when an image is captured, the position/orientation relationships between the manipulator end coordinate system $\Sigma_t$ and the imaging apparatus coordinate system $\Sigma_c$, the position/orientation relationships between the imaging apparatus coordinate system $\Sigma_c$ and the target object 41, and the position/orientation relationships between the manipulator end coordinate system $\Sigma_t$ and the holding device 3 are known, the position and orientation of the manipulator 1 when the target object 41 is held are obtained by mathematical formula (3). Thus, the position and orientation of the manipulator 1 of when the manipulator 1 holds the target object 41 can be obtained from an image obtained by the imaging apparatus 2 capturing an image of the target object 41. An example of a method for obtaining each displacement and each rotation matrix is described. (RX, RY, RZ) and RM are obtained based on the positional relationship from the world coordinate system $\Sigma_w$ set when the manipulator 1 is installed. (TX, TY, TZ) and TM are obtained based on joint angle information about the manipulator 1 by forward kinematics. (FX, FY, FZ) and FM are obtained based on the dimensions of the holding device 3. (CX, CY, CZ) and CM are obtained based on the dimensions of the imaging apparatus 2. Alternatively, (CX, CY, CZ) and CM may be obtained from the relative position/orientation relationships between the imaging apparatus 2 and the manipulator 1 by calibration. For example, (CX, CY, CZ) and CM may be obtained using the relative positional relationship between the imaging apparatus 2 and the manipulator 1. The relative positional relationship is obtained by capturing an image of a known two-dimensional marker in each of the states where the manipulator 1 is at and in a plurality of different positions and orientations, using the imaging apparatus 2. (OX, OY, OZ) and OM are obtained by capturing an image of the target object 41 using the imaging apparatus 2. In this case, the world coordinate system $\Sigma_w$ and the coordinate system $\Sigma_r$ of the manipulator 1 are separately considered, but may be considered as one coordinate system.

Further, a description has been given of the relationships between the coordinate systems when the target object 41 is held. The same applies to the process in which the target object 41 is placed. In step S10, placement areas are determined, and in step S15, the relationship between the coordinate systems $\Sigma_l$ and $\Sigma_{o'}$ is obtained. Thus, the target object coordinate system $\Sigma_o$ is replaced by taking into account transformation from the coordinate system $\Sigma_l$ to the coordinate system $\Sigma_{o'}$, whereby it is also possible to similarly derive coordinate systems to be used when the target object 41 is placed. Thus, it is possible to control the manipulator 1. In step S17, according to the control value generated in step S16, the controller 4 controls the holding device 3 and the manipulator 1 for conveying the target object 41 from the supply area to any placement area included in the target area 42. First, the controller 4 controls the holding device 3 for holding the target object 41. Based on the holding position and orientation information obtained in step S17, the manipulator 1 moves to the holding position and orientation, and the holding device 3 holds the target object 41. Next, the controller 4 controls the manipulator 1 to perform the operation of conveying and placing the target object 41. The pass points of the conveyance may be set in advance so that the robot arm makes as few unnecessary motions as possible. Then, based on the control value determined in step S16, the manipulator 1 moves to an area where the target object 41 is to be placed. Then, the manipulator 1 places the target object 41 in the target area 42.

In step S18, the generation unit 204 determines whether there is a target object 41 to be conveyed next, or a second area in the target area 42 where a target object 41 can be placed. Then, if the target object 41 or a second area in the target area 42 is not present (NO in step S18), the CPU 21 stops generating the control value and determines that the processing is to end. Then, the processing illustrated in FIG. 4 ends. If the target object 41 or a second area in the target area 42 is present (YES in step S18), the CPU 21 determines that the processing is to continue. Then, the processing returns to step S10. As the determination method, for example, the presence or absence of a target object 41 may be determined based on the image of the target objects 41 acquired in step S14, and the presence or absence of a second area in the target area 42 may be determined based on the image acquired in step S8 and the numbers of times of holding, conveyance, and placement in step S18. Alternatively, the number of times of processing is set in advance, and the determination is made based on whether the set number of times is reached. Yet alternatively, a sensor is placed in the supply area of the target objects 41, and the determination is made based on sensor information from the sensor. The sensor information may be obtained as follows. For example, a weight sensor may be provided in the supply area, and the weight of the supply area may be measured, to measure the number of remaining target objects 41 by weighing. Alternatively, the imaging apparatus 2 captures an image of the supply area of the target objects 41, and the determination is made based on image information regarding the obtained image. The determination may be made by a method other than the above described methods.

The information processing system 100, however, may not need to perform all the steps described in this flowchart. For example, in a case where the imaging apparatus 2 is a fixed camera, it is not necessary to determine the image capturing position. Thus, the process of step S2 or S11 can be skipped. Further, according to the present exemplary embodiment, a description has been given of an example in which a mode where the task is taught when the robot 10 waits (a setting mode) and a mode where the task is executed when the robot 10 operates (an operation mode) are both included in a single flowchart. This is because in a case where the robot 10 is a collaborative robot growing in recent years that does not require a safety fence, it can be assumed that a person enters the work range and instructs the robot 10 to perform an operation while the robot 10 is operating. The setting mode and the operation mode, however, may not be achieved by a single flowchart, and may be clearly separated and executed in different flowcharts.

In a case where the visual information is a moving image, it is necessary to estimate model data for the operation. In this case, an example of the methods for estimating the data using the moving image is a method for recognizing the hand of the user. Specifically, when the hand of the user appears in a moving image, an image is extracted as the first visual information. Then, when the hand of the user disappears from the moving image, an image is extracted as the second visual information. Alternatively, using a moving image between the first visual information and the second visual information, the robot 10 may be caused to learn a conveyance method. As another method, the user inputs the start and the end of a task learning operation through a user interface (UI). For example, using a button or a GUI, the user inputs an instruction to start or end the task learning operation. Alternatively, using a speech recognition tool, the user utters words indicating the start and the end of the task learning operation.

Further, the first visual information and the second visual information may be acquired by another method. For example, the user prepares in advance the state where a single target object 41 is in the target area 42, and then removing the target object 41. In this case, the initial state where the single target object 41 is in the target area 42 is set as the second visual information, and an image obtained by capturing an image of the empty target area 42 after a task learning operation is performed is set as the first visual information, whereby it is possible to teach the robot the arranging operation of the target objects 41 in the target area 42. Further, it is also possible to prepare a single pattern using not one unit of the target objects 41 but a plurality of target objects 41 and teach the robot the task of arranging the target objects 41 according to the pattern.

The estimation unit 203 may perform an estimation using a pre-trained model. For example, the estimation unit 203 may use a pre-trained model to which the first visual information and the second visual information are input, to obtain outputs of candidates for placement areas of objects.

In step S9, a description has been given of the process of obtaining the three-dimensional area of the target objects 41. Alternatively, height information regarding the three-dimensional area may be obtained in advance and stored in the storage unit 200. The height information is information mainly used to hold an object in the supply area and used to place the object in a placement area in the target area 42. In a case where the height information regarding the target objects 41 is known, the estimation unit 203 does not estimate the height information using the distance information in step S9.

In step S10, the placement areas of the target objects 41 may be identified according to a predetermined rule. For example, it is desirable that the directions of the target objects 41 are adjusted to the top-bottom direction of the target area 42 when the target objects 41 are placed. Further, in a case where the target objects 41 have front-back directions, the placement areas may be determined in such a manner that the front-back directions of the target objects 41 are aligned. Further, in a case where characters are printed on each target object 41, the placement areas are determined in such a manner that the characters on placed objects 41 can be read in the same direction. Further, the more the placement method suitable for the manipulator 1 can reduce failure in the conveyance task. By such processing, even when components are packed in a factory, it is possible to easily setup robots by an operation of a user without help from a specialist.

In step S15, the holding position of the target object 41 may be identified according to a predetermined rule. For example, it is desirable that the direction of the target object 41 is adjusted to the top-bottom direction of a holding area when the target objects 41 are placed. Further, in a case where the target objects 41 have front-back directions, the holding position may be determined in such a manner that the front-back directions of the target objects 41 are aligned. Further, in a case where characters are printed on each target object 41, the holding position is determined in such a manner that the characters on the target object 41 can be read. Further, the placement method suitable for the manipulator 1 can reduce failure in the conveyance task. By such processing, even when components are packed in a factory, it is possible to easily setup robots by an operation of a user without help from a specialist.

As described above, it is possible to efficiently teach a robot the task of placing target objects next to each other.

Next, a second exemplary embodiment of the present disclosure is described.

In the second exemplary embodiment, before the robot 10 conveys the target objects 41, a simulation of the operation of the robot 10 is indicated to the user without actually moving the robot 10. After a confirmation is received from the user in advance, the robot 10 moves. The process in which the robot 10 conveys the target objects 41 from the supply area to the target area 42 is also fed back. This is effective, for example, in a case where the user wishes to confirm whether the robot 10 can execute a task operation as desired by the user. Further, this is an effective in a case where the user wishes to reduce failure as much as possible if target objects are particularly expensive. According to the present exemplary embodiment, a "runtime operation" refers to an operation to be automatically executed by the robot 10. Specifically, the "runtime operation" refers to an operation in which the robot 10 automatically executes work after the user finishes the operation of moving one unit of the target objects 41. In contrast, "task teaching" refers to the execution of a task that the user wishes to teach the robot 10.

According to the second exemplary embodiment, similarly to the first exemplary embodiment, first, before the target objects 41 are moved to the target area 42, the imaging apparatus 2 obtains an image or a moving image by image-capturing the target area 42. Next, the user is instructed to move the target objects 41 to placement areas. After the target objects 41 are moved to the target area 42, the imaging apparatus 2 obtains an image by image-capturing the target area 42. Then, based on the images obtained before and after the movement of the target objects 41, a control value with which a next target object 41 is moved to the target area 42 is generated. In this process, unlike the first exemplary embodiment, in a runtime operation to be performed for the first time, before the robot 10 operates and conveys the target objects 41, a simulation of the operation of the robot 10 to be executed based on the control value is indicated to the user. Then, whether the operation of the robot 10 performed in the simulation is appropriate is determined by the user. If the determination that the operation is not appropriate is obtained, the user is instructed to further move one more unit of the target objects 41 to the target area 42. If the determination that the runtime operation of the robot 10 is appropriate is obtained, the robot 10 operates slower than normal. In this manner, before the robot 10 operates, it is possible to make in advance a confirmation of the operation of the robot 10 and the placement areas after the target objects 41 are moved. This results in reducing the redoing of operation and improving the operation efficiency.

Figure 14:
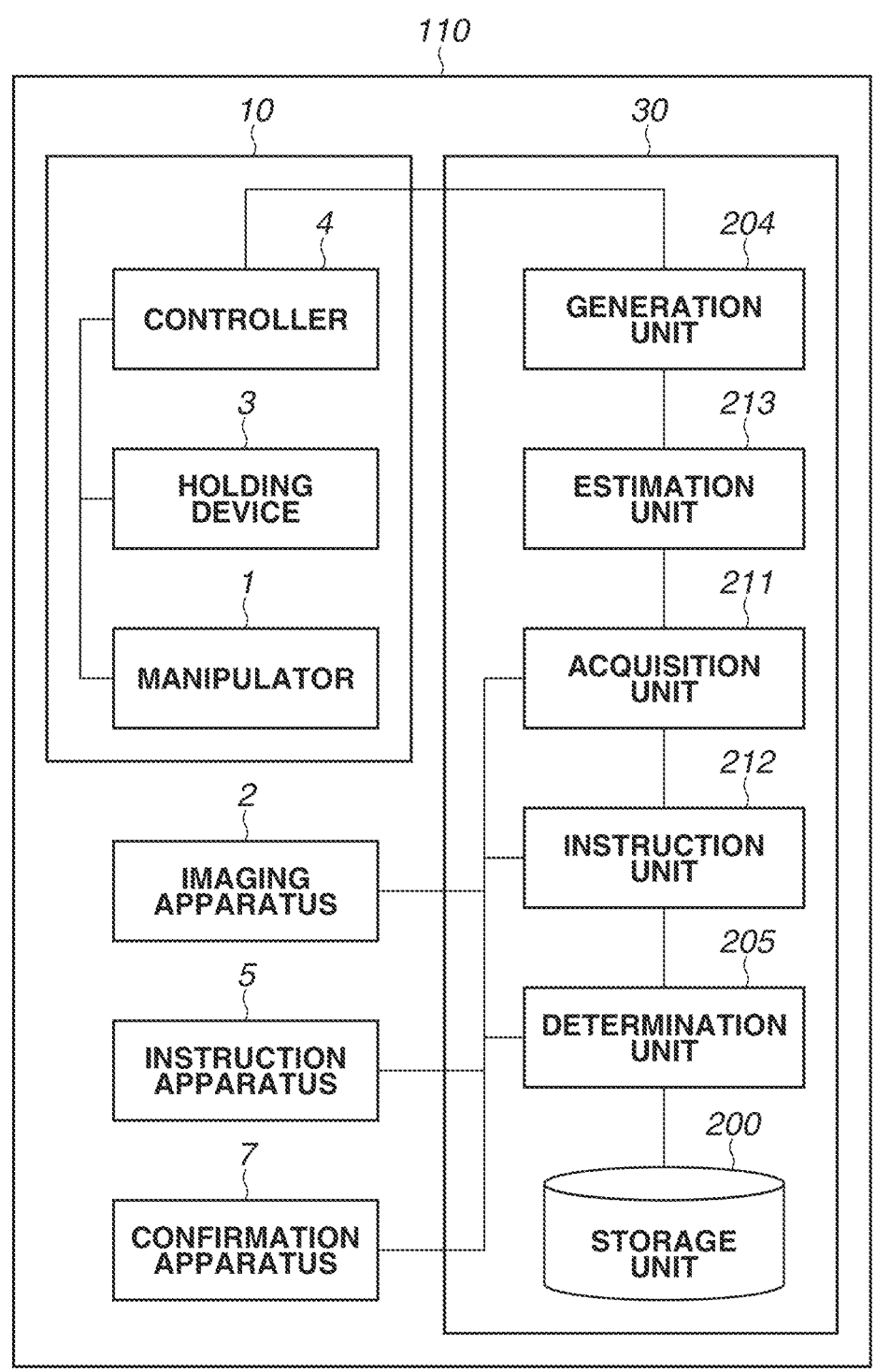
FIG. 14 is a block diagram illustrating an example of a functional configuration of an information processing system.

FIG. 14 is a block diagram illustrating examples of the functional configurations of an information processing system 110 and an information processing apparatus 30 according to the present exemplary embodiment. The information processing system 110 and the information processing apparatus 30 illustrated in FIG. 14 are different from the information processing system 100 and the information processing apparatus 20 illustrated in FIG. 3 in that a confirmation apparatus 7 and a determination unit 205 are added, and also in the processing of an instruction unit 212 and the processing of an estimation unit 213. The differences from the first exemplary embodiment are described below.

The confirmation apparatus 7 indicates to the user a simulation based on a control value with which the robot 10 conveys the target objects 41 to the target area 42. Then, the confirmation apparatus 7 receives from the user the determination result of whether the operation of the robot 10, i.e., the control value, is appropriate. For example, the confirmation apparatus 7 is attached near the robot 10. Alternatively, the confirmation apparatus 7 may be integrated with the instruction apparatus 5, or the confirmation apparatus 7 may be achieved by using the instruction apparatus 5 and the imaging apparatus 2. The confirmation apparatus 7 includes, for example, a microphone. After the user confirms the simulated operation of the robot 10 for moving the target objects 41 to the target area 42 indicated by the instruction apparatus 5, the confirmation apparatus 7 catches voice uttered by the user, to receive the determination result. Alternatively, the confirmation apparatus 7 includes a display attached integrally with the instruction apparatus 5 near the robot 10, or a portable tablet terminal. In this case, after the user confirms the operation of the robot 10 for moving the target objects 41 to the target area 42 indicated by a GUI, the confirmation apparatus 7 receives the determination result via the GUI on a touch panel. Yet alternatively, the confirmation apparatus 7 is composed of a camera. After the user confirms the simulated operation of the robot 10 for moving the target objects 41 to a target state indicated by a projector, an HMD, or AR glasses, the confirmation apparatus 7 receives the determination result based on a gesture operation of the user. Yet alternatively, a method other than these methods can be used so long as the method can receive the determination result of the user.

Based on an image acquired from an acquisition unit 211, the instruction unit 212 instructs the user to perform a predetermined operation. Specifically, if the instruction unit 212 acquires an image of the supply area or the target area 42, then to instruct the user to move the target objects 41 to the target area 42, the instruction unit 212 sends an instruction trigger to the instruction apparatus 5. Further, if the user determines that a simulation of the robot 10 is not appropriate, then based on a command from the estimation unit 213, the instruction unit 212 sends an instruction trigger to the instruction apparatus 5.

Based on visual information acquired from the acquisition unit 211, the estimation unit 213 estimates areas to which the target objects 41 are to be conveyed by the holding device 3. Further, based on the visual information and the estimated areas of the target objects 41, the estimation unit 213 estimates the positions where the target objects 41 are to be placed by using the image feature of an area having an object in the target area 42. For example, to indicate to the user the operation by the robot 10 for moving a determined target object 41 to any placement area included in the target area 42, the estimation unit 213 sends a control value to the controller 4. Before controlling the manipulator 1, the controller 4 sends operation information for executing a simulation to the determination unit 205. If there is a plurality of candidates for operation information, and when the robot 10 actually operates, operation information with the highest probability that the target object 41 is moved to the target area 42 is executed. Alternatively, the estimation unit 213 may send a plurality of candidates for operation information to the determination unit 205. In this case, priority is given to operation information with a high probability of success of a task, whereby the determination unit 205 enables the user to confirm operation information in descending order of probability.

Further, after the controller 4 sends operation information for executing a simulation to the determination unit 205, the acquisition unit 211 acquires from the determination unit 205 the result of the user's determination of whether the operation is appropriate. The operation information is information about the operation of the robot 10 for executing control in movement of a target object 41 to the target area 42 and includes information regarding physical changes such as the trajectories and the speeds on and at which the manipulator 1 and the holding device 3 are to move. If the determination that the operation is not appropriate is obtained, then to instruct the user to further move one more target object 41 to the target area 42, the acquisition unit 211 sends a command to the instruction unit 212. If the determination that the operation is appropriate is obtained, the robot 10 is controlled in such a manner that the operation is performed more slowly than normal.

If a simulation of a predetermined operation is executed based on operation information regarding the robot 10, the determination unit 205 receives from the user the determination result of whether the simulation executed based on a control value is appropriate. The content of the simulation indicated to the user is information about the progress of the operation until a movement is completed, such as which trajectory the robot 10 is to take when moving a target object 41, or information about a movement completion state, such as what position and orientation the target object 41 is to be placed at and in. If receiving information for executing the simulation of the robot 10 from the controller 4, the determination unit 205 indicates the information to the user. Then, to obtain the determination result, the determination unit 205 sends a confirmation trigger to the confirmation apparatus 7. If, however, the instruction apparatus 5 is used to indicate operation information to the user, the determination unit 205 sends a confirmation trigger to the instruction apparatus 5. If receiving the determination result from the user, the determination unit 205 sends the determination result to the estimation unit 213.

Figure 15:
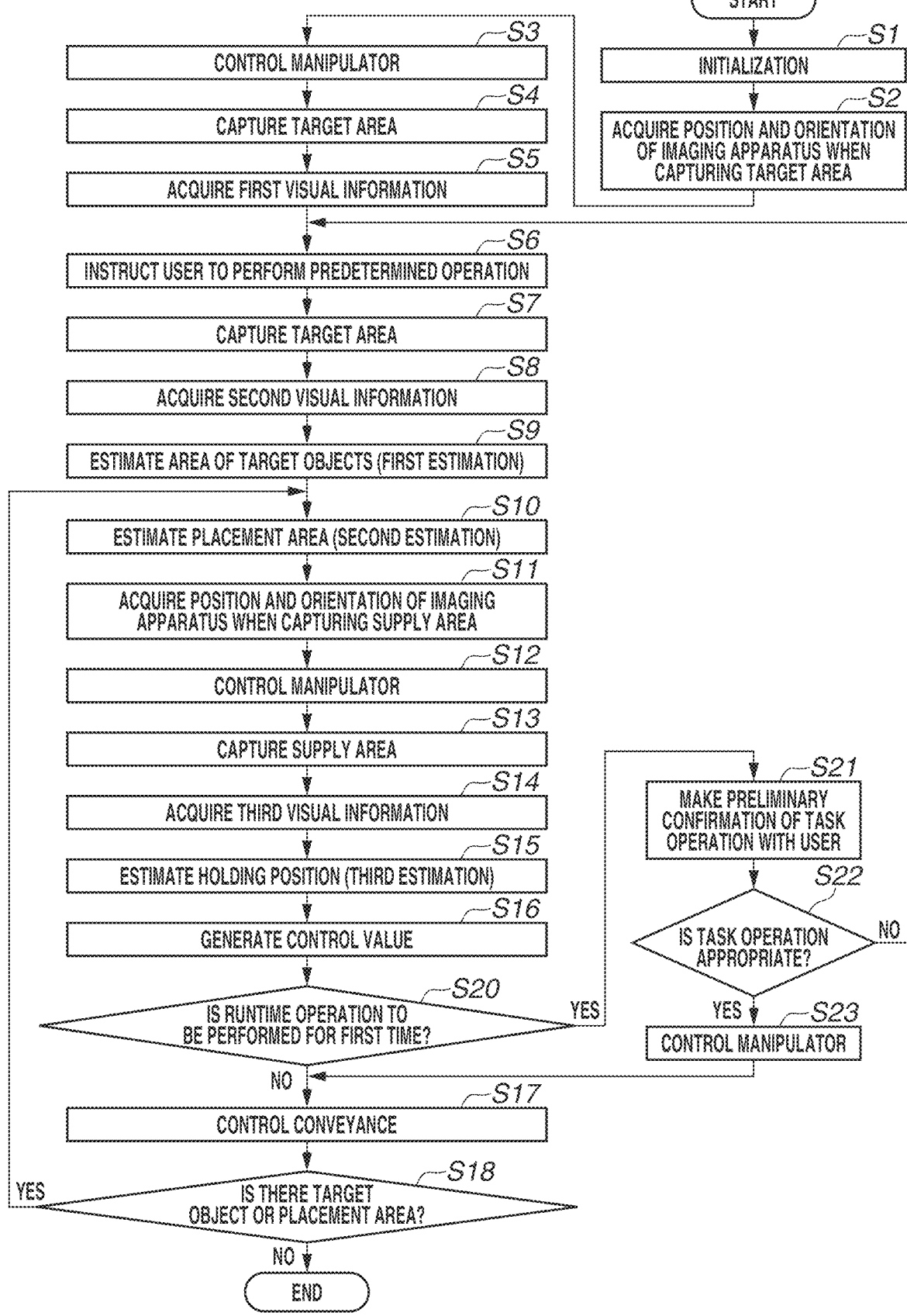
FIG. 15 is a flowchart illustrating processing executed by the information processing system.

FIG. 15 is a flowchart illustrating processing executed by the information processing system 110 according to the present exemplary embodiment. The differences in processing content from FIG. 4 illustrated in the first exemplary embodiment are each described.

Figure 19:
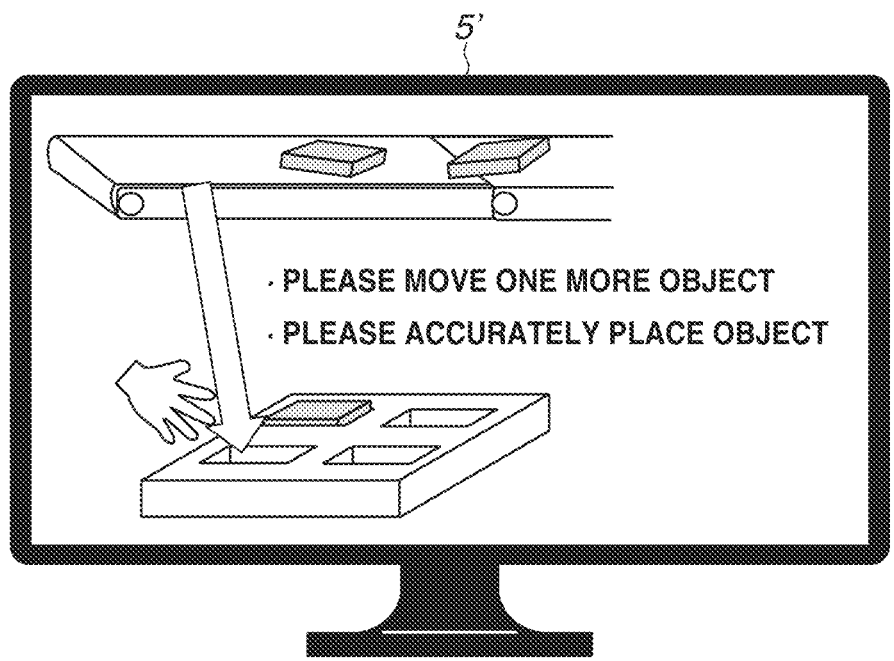
FIG. 19 is a diagram illustrating an example of a graphical user interface (GUI).

In step S6, to instruct the user to perform a predetermined operation, the instruction unit 212 sends an instruction trigger to the instruction apparatus 5. If the instruction unit 212 acquires a command from the acquisition unit 211 based on the determination result that a simulation of the robot 10 indicated to the user is not appropriate, then using the instruction apparatus 5, the instruction unit 212 instructs the user to further move a target object 41 to the target area 42. In this process, the user places an object with as high accuracy as possible. FIG. 19 is an example of a GUI in a case where the instruction to the user is displayed on the display.

In step S20, the determination unit 205 determines whether a runtime operation (an object conveyance task by the robot 10) is to be performed for the first time. If the runtime operation to be performed is not for the first time (NO in step S20), the manipulator 1 and the holding are controlled in step S17. If the runtime operation to be performed is for the first time (YES in step S20), the processing proceeds to step S21. In step S21, the determination unit 205 performs the process of indicating the operation of the robot 10 determined up to step S16 as a simulation to the user and obtaining the determination result.

Figure 20:
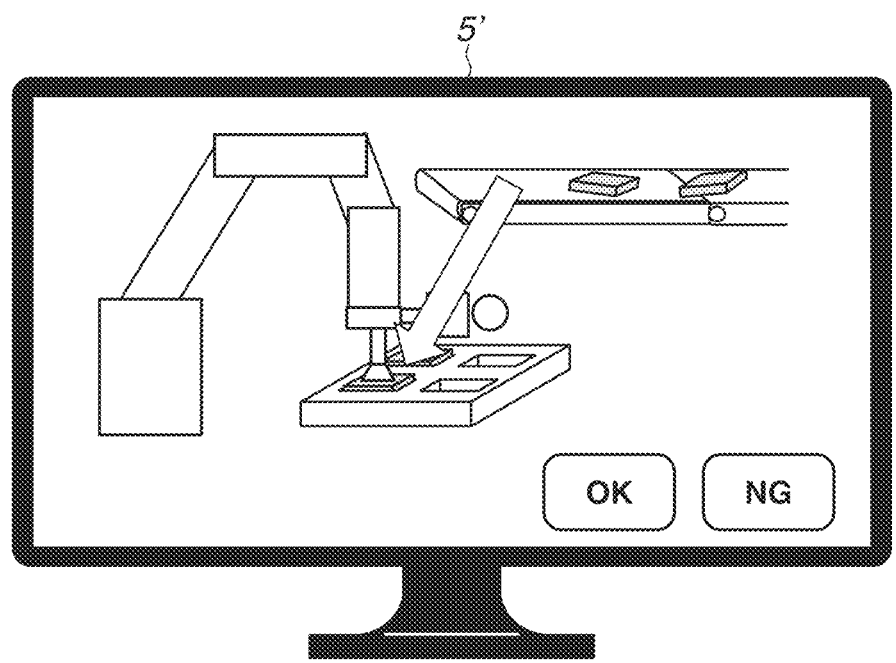
FIG. 20 is a diagram illustrating an example of a GUI.

In step S21, the instruction unit 202 indicates to the user the simulation in which the robot 10 moves a target object 41 to a placement area. Then, the instruction unit 202 receives from the user the determination result of whether the movement of the target object 41 is appropriate. This process is performed to confirm with the user the control of the robot 10 determined up to step S16. In this process, as a method for indicating to the user the simulation in which the robot 10 moves the target object 41 to a target state, voice, a GUI, projection, MR, AR, or VR is used as in the instruction method in step S6. For example, information about which portion of the target object 41 is to be held by the robot 10, how the target object 41 is to be conveyed by the robot 10, and where the target object 41 is to be placed by the robot 10 is indicated to the user by voice. In the case of a GUI, the operation simulation of the robot 10 is displayed on the display and indicated to the user. In the case of projection, the target object 41 is displayed on the target area 42 in a projection mapping manner and indicated to the user. FIG. 20 illustrates an example of a GUI in a case where the simulation result is indicated on the display, to obtain determination of the user. If the simulation result is correct, the user presses an OK button. If the simulation result is incorrect, the user presses an NG button. In the case of MR, AR, or VR, the operation simulation of the state where the robot 10 conveys and places the target object 41 is displayed in a superimposed manner in real space or virtual space and indicated to the user.

In step S22, based on the result of the preliminary confirmation received from the user in step S21, the determination unit 205 determines whether the control value of the robot 10 is appropriate. If the determination that the control value is appropriate is obtained (YES in step S22), the processing proceeds to step S23. If the determination that the control value is not appropriate is obtained (NO in step S22), the processing returns to step S6.

In step S23, the controller 4 controls the manipulator 1 to move the target object 41. In this process, since the runtime operation to be performed is for the first time, the controller 4 controls the robot 10 in such a manner that the robot 10 operates at a slower speed than normal so that also in the actual apparatus, the user can confirm whether the operation that is appropriate according to the determination of the user in the preliminary confirmation is truly appropriate.

As described above, according to the present exemplary embodiment, before the robot 10 operates according to a determined operation, a simulation based on a control value is indicated to the user, and the determination of whether the operation of moving a target object 41 to the target area 42 by the robot 10 is appropriate is obtained. If the determination that the operation is not appropriate is obtained, the user is instructed to further move one more target object 41 to the target area 42. Teaching data is increased in such a manner, whereby it is possible to expect an improvement in the estimation accuracy. Further, if the determination that the operation is appropriate is obtained, the robot 10 is executes the operation more slowly than normal.

According to the second exemplary embodiment, before the robot 10 operates, the operation of the robot 10 and the state of a target object 41 after the movement of the target object 41 can be confirmed in advance. This reduces the redoing of operation. As a result, it is possible to improve the operation efficiency.

Next, a third exemplary embodiment of the present disclosure is described. The third exemplary embodiment is different from the first exemplary embodiment in that after the robot 10 moves a target object 41, the user can make an after-the-fact confirmation of whether the target object 41 is placed in a desired area in the target area 42. There is a plurality of possible causes of a case where the robot 10 cannot execute a task taught by the user. Example of the causes includes a case where the teaching by the user is not desirable. More specifically, this is a case where a target object 41 has been mispositioned or incorrectly placed by the user. In this case, the cause is remedied by the user placing the target object 41 again at an accurate position when teaching the operation. Further, in another example case, an estimation process is not successfully performed by the estimation unit 203. In such a case, for example, the reflection of light affects the creation of a template for a target object 41, and area data of the object is not successfully obtained. There is thus a possibility that the cause is remedied by attempting a teaching operation multiple times. To overcome such a cause, according to the present exemplary embodiment, the user teaches a task to remedy an operation actually performed by the robot 10. In this manner, even if the robot 10 performs an incorrect operation, it is possible to easily correct the incorrect operation on the spot. Thus, it is possible to improve the operation efficiency.

Specifically, if a runtime operation to be performed is for the first time, the user can make an after-the-fact confirmation of whether a target object 41 is placed in the target area 42. If the determination result that the placement is appropriate is obtained, the processing continues. If the determination result that the placement is not appropriate is obtained, the user is instructed to move the target object 41 that is not appropriately moved to the target area 42 to an appropriate state. Based on the result of the movement, the robot 10 corrects the method for moving the target object 41 to the target area 42.

FIG. 14 is a block diagram illustrating examples of the functional configurations of an information processing system 110 according to the present exemplary embodiment. The information processing system 110 illustrated in FIG. 14 are different from the information processing system 100 illustrated in FIG. 3 in that a confirmation apparatus 7 and a determination unit 205 are added, and also in the processing of an acquisition unit 211 and the processing of an instruction unit 212. The confirmation apparatus 7, however, is similar to that described in the second exemplary embodiment.

When a task is taught, the acquisition unit 211 acquires feedback of the user's determination of whether the result of the movement of a target object 41 to a target state is appropriate. The feedback is performed by the user inputting the result of confirming the actual state to the controller 4. If the robot 10 finishes executing an operation, the acquisition unit 211 acquires the determination result of the after-the-fact confirmation from the acquisition unit 211. If the determination that the operation is appropriate is obtained, the processing continues. If it is determined that the operation is not appropriate, then to instruct the user to move the target object 41 to an appropriate state, the acquisition unit 211 sends a command to the instruction unit 212.

Based on feedback from the user regarding whether a target object 41 is appropriately conveyed, the determination unit 205 determines whether a generated control value is appropriate. The determination unit 205 makes the confirmation with the user in a case where a runtime operation is to be performed for the first time, or the previous runtime operation is failed. The determination is made by confirming where the target object 41 has been placed. For example, in the case of the task of placing a target object 41 at a predetermined position by pick-and-place, if the target object 41 is placed at the predetermined position, the user determines that the movement is appropriate. If, however, the target object 41 is shifted from the predetermined position, or another object other than the target object 41 is conveyed, the user determines that the movement is not appropriate. The determination result is sent to an estimation unit 213.

Based on an instruction trigger from the estimation unit 213, the instruction unit 212 sends an instruction trigger to the instruction apparatus 5 to move a target object 41 to an appropriate area in the target area 42.

Figure 16:
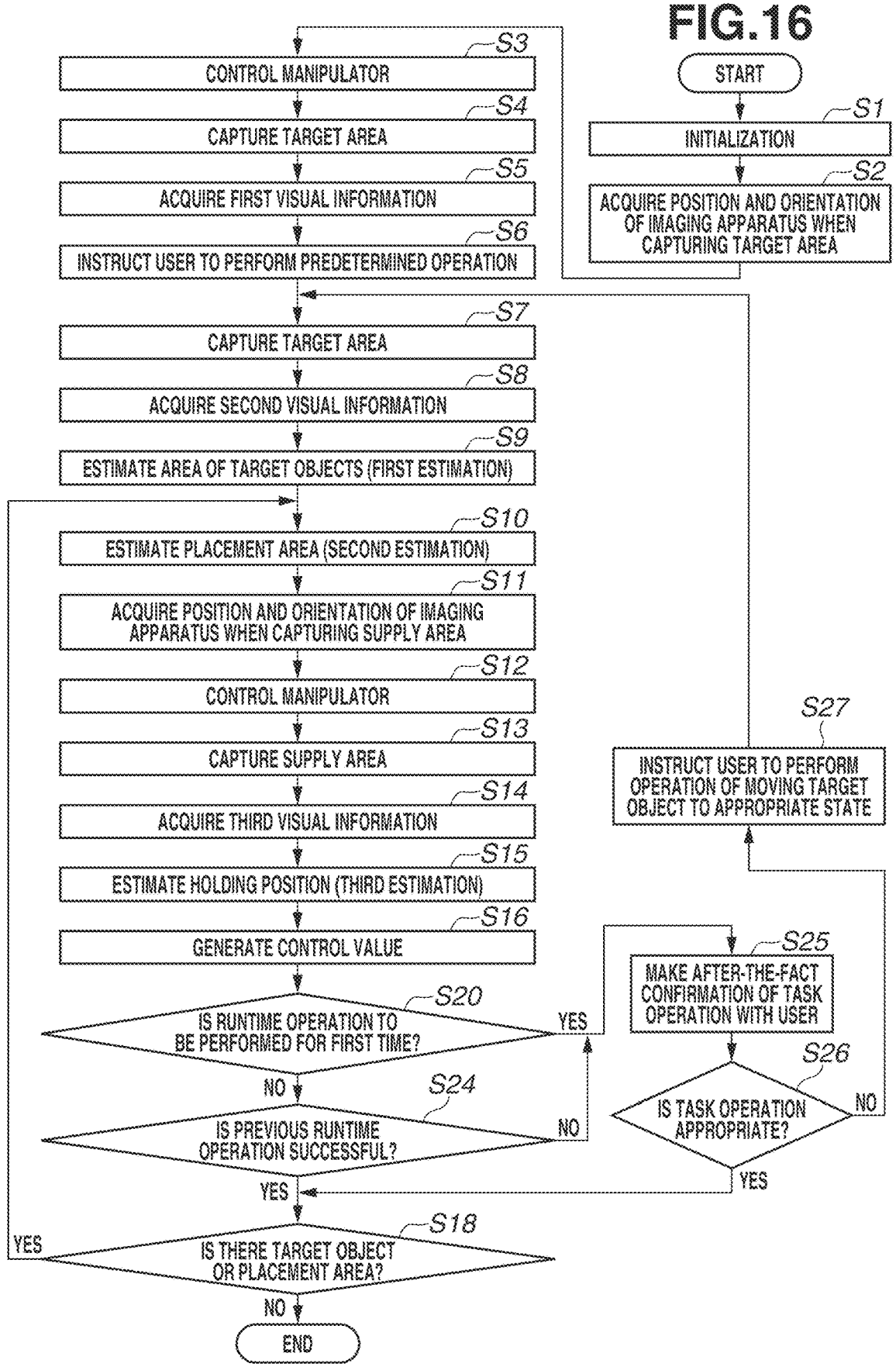
FIG. 16 is a flowchart illustrating processing executed by an information processing system.

FIG. 16 is a flowchart illustrating processing executed by the information processing system 110 according to the present exemplary embodiment. The differences in processing content from FIG. 4 illustrated in the first exemplary embodiment are each described.

In step S20, the determination unit 205 determines whether a runtime operation is to be performed for the first time. If the runtime operation to be performed is not for the first time (NO in step S20), a determination process in step S24 is performed. If the runtime operation to be performed is for the first time (YES in step S20), the processing proceeds to step S25. In step S25, the determination unit 205 confirms a simulation with the user. If the user wishes to also check the runtime operation to be performed for the second and subsequent times, the number of times in this process may be set to another number of times such as the second time or the third time. Thus, a setting may not necessarily be made in such a manner that only if the runtime operation to be performed is for the first time, the processing proceeds to step S25.

In step S24, the determination unit 205 determines whether the previous runtime operation is successful. If the previous runtime operation is successful (YES in step S24), the processing proceeds to step S18. If the previous runtime operation is failed (NO in step S24), the processing proceeds to step S25. In step S25, the determination unit 205 confirms the result of the operation with the user. This configuration is for a case in which even if the movement of a target object 41 to the target area 42 is successful in the runtime operation performed for the first time, but the movement of a target object 41 to the target area 42 is failed in the runtime operation performed for the second time, so that a confirmation can be made. Further, in the flowchart, the next process is determined based on the success or failure of the previous runtime operation. Alternatively, the number of failures may be taken into account. For example, if the conveyance of the same target object 41 is failed twice in a row, the process of suspending the operation, stopping the robot 10, and calling the operator may be performed. In this case, the user is instructed again to move the target object 41 to an appropriate state in the subsequent process. This is because if an appropriate operation cannot be determined even according to instructions given multiple times, there is a possibility that it is difficult to determine the operation in this situation, or the appropriate operation cannot be performed due to the breakdown of the system.

Figure 21:
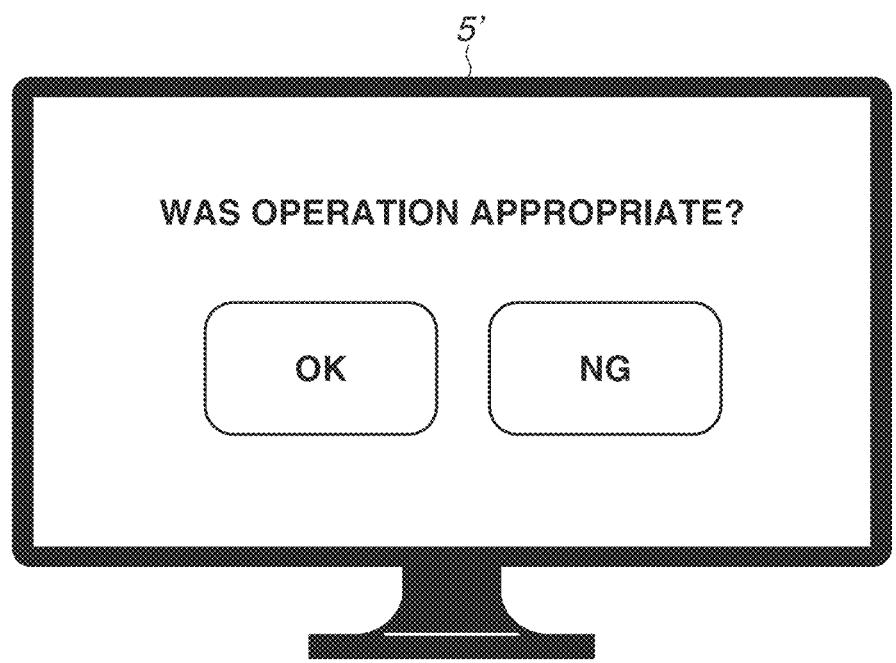
FIG. 21 is a diagram illustrating an example of a GUI.

In step S25, the acquisition unit 211 acquires feedback of the user's determination of whether the operation of moving a target object 41 to the target area 42 by the robot 10 is appropriate. The feedback is performed by the user inputting the result of confirming the actual state to the controller 4 or the like. Specifically, in the case of the task for conveying an object, the acquisition unit 211 confirms whether the object is successfully placed at a desired location. FIG. 21 is an example of a screen of a GUI in a case where the confirmation is made with the user on the display. The timing when the user is instructed to make the confirmation may be indicated by, if the controller 4 finishes controlling the robot 10, sending a control completion trigger to the instruction unit 212 and by the instruction unit 212 using an input from the instruction apparatus 5. Alternatively, another method may be employed. If the user receives an instruction from the instruction apparatus 5 and inputs the determination result, the confirmation apparatus 7 receives the determination result, and the determination unit 205 receives determination result information and sends the determination result to the estimation unit 213.

In step S26, the determination unit 205 determines whether the operation of moving the target object 41 to the target area 42 by the robot 10 is appropriate. The determination unit 205 acquires the feedback input by the user in step S25 and determines the next process based on the acquired feedback. If the determination result that the operation is appropriate is obtained (YES in step S26), the processing proceeds to step S19. If the determination result that the operation is not appropriate is obtained (NO in step S26), the processing proceeds to step S27. In step S27, the process of correcting the operation of the robot 10 is performed.

Figure 22:
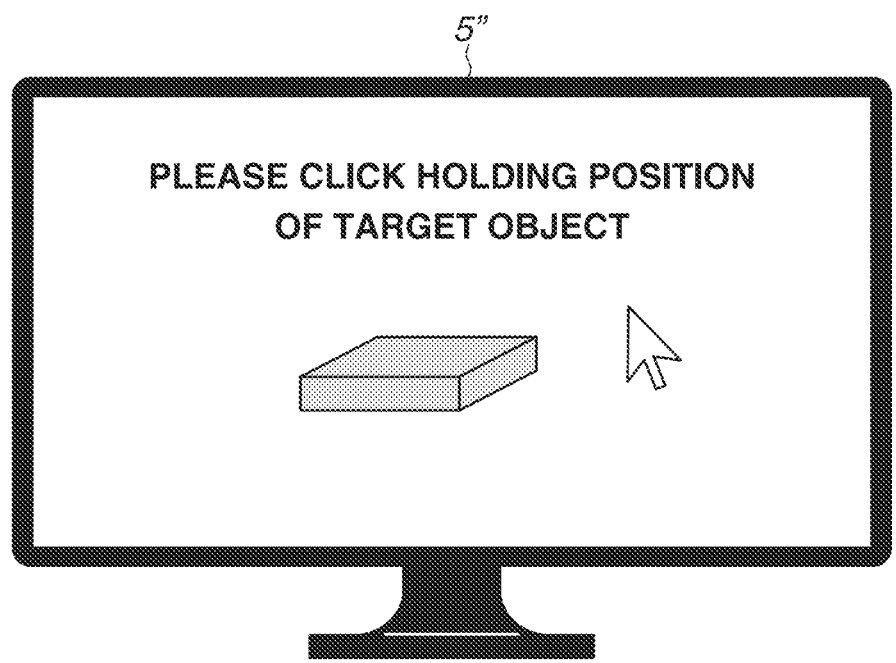
FIG. 22 is a diagram illustrating an example of a GUI.

In step S27, the instruction unit 212 instructs the user to move the target object 41 to an appropriate state. If the estimation unit 213 acquires the determination result that the conveyance of the target object 41 to the target area 42 is not appropriate, it is necessary to compensate for insufficient information to determine an appropriate operation of the robot 10. For example, to recognize a correct movement state anew, the user is instructed to move again the target object 41 to the target state. The operation to be performed by the user may not be the same operation as that of the task teaching performed in step S6. For example, if it is necessary to correct the position where the target object 41 is to be held, the user teaches the position where the target object 41 is to be held. This is effective in a case where the information processing apparatus 20 provides a default rule that the center of gravity of the target object 41 is set as the holding position. FIG. 22 is an example of a screen of a GUI in a case where the user is instructed to teach the robot 10 the holding position on the display. The user is instructed to teach the robot 10 the holding position by clicking with a mouse a portion to be held or tapping on a touch panel the portion to be held. If the cause of the failure of the task by the robot 10 is known, such feedback is given, whereby it is possible to expect a reduction in failures of a task operation. To give the instruction to the user, the instruction unit 212 sends an instruction trigger to the instruction apparatus 5. Then, the processing returns to step S7, and the processing continues.

As described above, according to the present exemplary embodiment, the user determines on the spot the operation of the robot 10 executed based on a generated control value. If the operation is incorrect, the user corrects the operation on the spot. Even if the robot 10 performs an incorrect operation, it is possible to easily correct the incorrect operation on the spot. Thus, it is possible to improve the operation efficiency.

In the first to third exemplary embodiments, when the user moves a target object 41, the user may not need to move the target object 41 from an initial state to a target state. The user may move the target object 41 from the target state to the initial state. For example, when pick-and-place is performed, the user may not need to move a target object 41 from a supply position where the target object 41 is to be picked up to a placement area where the target object 41 is to be placed. The user may move the target object 41 present in the placement area to the supply position. In this case, information indicating that the current state is the state where the object is in a placement area included in the target area 42 before the movement, and the state after the object is moved is an initial state is input to the information processing apparatus 20. Further, the user may not need to move a target object 41 from an initial state. The user may move the target object 41 from an intermediate state so long as the initial state can be known by another method. Examples of a case where the initial state is known by another method include a case where the supply state of the target object 41 is always constant, and the information processing apparatus 20 performs processing while recognizing this fact.

In the first to third exemplary embodiments, visual information to be acquired may be a still image or a moving image. Further, in the case of a moving image, the timing of the start and the end of the capturing of the image may be manually set or automatically set. If the timing is manually set, the user may input a trigger at the timing of the start or the end, or the timing may be set based on a time determined in advance. If the timing is automatically set, by tracking the motion of an object in the image, the image capturing is to be started if the object starts to move and the image capturing is to be ended if the object stops. Alternatively, a method for recognizing the hand of the user and capturing the hand while the hand is present in the image may be employed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-182089, filed Sep. 27, 2018, which is hereby incorporated by reference herein in its entirety.

What is claimed is:

1. An information processing apparatus for controlling a robot that conveys an object from a supply area to a target area, the information processing apparatus comprising:
   an acquisition unit configured to acquire a first image and a second image, the first image being an image of the target area in an initial state, the second image being an image of the target area where a first object conveyed by a user from the supply area is placed;
   an estimation unit configured to estimate one or more second areas in the target area, based on a shape feature of a first area in the target area before the first object is placed by the user estimated using the first image and the second image, the one or more second areas each being an area where an object in the supply area can be placed and being at a different position from the first area; and
   a control unit configured to control the robot to convey a second object different from the first object from the supply area to any of the second areas.

2. The information processing apparatus according to claim 1, wherein the control unit controls the robot to convey the second object to any of the second areas not having the first object.

3. The information processing apparatus according to claim 1, wherein in a case where the second object does not remain in the supply area, the control unit stops the robot.

4. The information processing apparatus according to claim 1, wherein in a case where the target area has none of the second areas where an object can be placed, the control unit stops the robot.

5. The information processing apparatus according to claim 1, wherein the target area is an area having partial areas which are similar in shape to the first area and are regularly arranged.

6. The information processing apparatus according to claim 1, wherein the control unit controls the robot to convey and place the second object in such a manner that a direction of the second object is aligned with a direction of the first object.

7. The information processing apparatus according to claim 1, wherein the control unit controls the robot to place the second object in such a manner that a front-back direction of the second object corresponds to a front-back direction of the first object.

8. The information processing apparatus according to claim 1, wherein based on a difference between the first image and the second image, the estimation unit estimates the location of the first area where the first object is placed.

9. The information processing apparatus according to claim 1, wherein the feature of the first area is acquired from the first image.

10. The information processing apparatus according to claim 1, wherein the estimation unit estimates the one or more second areas in the target area, by template matching between the feature of the first area and a feature of a portion of the first image.

11. The information processing apparatus according to claim 1, further comprising an instruction unit configured to notify a user that the user performs an operation for conveying the first object from the supply area to the target area, after the first image is captured.

12. The information processing apparatus according to claim 11, wherein in a case where none of the second objects remain in the supply area, the instruction unit notifies the user that the operation is completed.

13. The information processing apparatus according to claim 11, wherein in a case where the target area has none of the second areas where an object can be placed, the instruction unit notifies the user that the operation is completed.

14. The information processing apparatus according to claim 1,
   wherein the acquisition unit further acquires a third image obtained by image-capturing the supply area where the first object is randomly placed, and
   wherein the estimation unit estimates a candidate for a holding position by template matching between the third image and the feature of the first area which is estimated from the first image and the second image and has the first object.

15. The information processing apparatus according to claim 1, further comprising:
   a display unit configured to display the second areas estimated by the estimation unit, using a predetermined method; and
   a confirmation reception unit configured to receive from a user a determination of whether conveyance of the second object to the second areas is appropriate,
   wherein in a case where the user determines that the conveyance is not appropriate, the acquisition unit acquires a third image captured in a state where the first object has been placed again in a fourth area in the target area, and
   wherein based on the first image and the third image, the estimation unit estimates the fourth area as the second areas.

16. The information processing apparatus according to claim 15, wherein the display unit displays on a display device an area corresponding to second areas in the first image.

17. The information processing apparatus according to claim 15, wherein the display unit projects a predetermined image onto the second areas using a projection device.

18. The information processing apparatus according to claim 1, wherein the acquisition unit acquires the first image being the image of the target area in the initial state in which the first object is not yet placed.

19. A non-transitory storage medium that stores a program for causing a computer to execute an information processing method for generating a control value of a robot that conveys an object from a supply area to a target area, the information processing method comprising:

acquiring a first image and a second image, the first image being an image of a target area in an initial state, the second image being an image of the target area where a first object conveyed by a user from a supply area is placed;

estimating, in the target area, one or more second areas in the target area, based on a shape feature of a first area in the target area before the first object is played by the user estimated using the first image and the second image, the one or more second areas each being an area where an object in the supply area can be placed and being at a different position from the first area; and generating the control value with which the robot is to convey a second object different from the first object from the supply area to any of the one or more second areas.

20. An information processing method for generating a control value of a robot that conveys an object from a supply area to a target area, the information processing method comprising:

acquiring a first image and a second image, the first image being an image of a target area in an initial state, the second image being an image of the target area where a first object conveyed by a user from a supply area is placed;

estimating, in the target area, one or more second areas in the target area, based on a shape feature of a first area in the target area before the first object is played by the user estimated using the first image and the second image, the one or more second areas each being an area where an object in the supply area can be placed and being at a different position from the first area; and generating the control value with which the robot is to convey a second object different from the first object from the supply area to any of the one or more second areas.

21. An information processing system for generating a control value use by a robot that conveys an object from a supply area to a target area, the information processing system comprising:

an imaging apparatus configured to capture a first image and a second image, the first image being an image of a target area in an initial state, the second image being an image of the target area where a first object conveyed by a user from a supply area is placed; and an information processing apparatus including:

an acquisition unit configured to acquire the first image and the second image from the imaging apparatus;

an estimation unit configured to estimate one or more second areas in the target area, based on a shape feature of a first area in the target area before the first object is placed by the user estimated using the first image and the second image, the one or more second areas each being an area where an object in the supply area can be placed and being at a different position from the first area;

a generation unit configured to generate the control value with which the robot is to convey a second object different from the first object from the supply area to any of the one or more second areas; and the robot configured to convey the object based on the control value.

* * * * *